US 9,810,861 B2

(12) United States Patent
Thompson et al.

(10) Patent No.: US 9,810,861 B2
(45) Date of Patent: Nov. 7, 2017

(54) RUGGEDIZED OPTICAL FIBER CONNECTION STRUCTURES AND ASSEMBLIES

(71) Applicant: 3M INNOVATIVE PROPERTIES COMPANY, St. Paul, MN (US)

(72) Inventors: Zachary M. Thompson, Austin, TX (US); Donald K. Larson, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/965,036

(22) Filed: Dec. 10, 2015

(65) Prior Publication Data
US 2016/0178859 A1 Jun. 23, 2016

Related U.S. Application Data

(60) Provisional application No. 62/094,399, filed on Dec. 19, 2014.

(51) Int. Cl.
*G02B 6/38* (2006.01)

(52) U.S. Cl.
CPC .......... *G02B 6/3897* (2013.01); *G02B 6/3825* (2013.01); *G02B 6/3879* (2013.01)

(58) Field of Classification Search
CPC .................................. G02B 6/38; G02B 6/00
USPC ........................................................ 385/56
See application file for complete search history.

(56) References Cited

U.S. PATENT DOCUMENTS

| 4,886,335 | A  | * | 12/1989 | Yanagawa et al. | 385/16 |
| 6,379,052 | B1 | * | 4/2002  | de Jong et al.  | 385/59 |
| 7,720,343 | B2 | * | 5/2010  | Barth et al.    | 385/135 |
| 8,270,796 | B2 | * | 9/2012  | Nhep            | 385/135 |
| 8,649,649 | B2 | * | 2/2014  | Smith et al.    | 385/136 |
| 8,870,469 | B2 | * | 10/2014 | Kachmar         | 385/78 |
| 9,028,154 | B2 | * | 5/2015  | Hui et al.      | 385/58 |
| 2001/0026661 | A1 | * | 10/2001 | de Jong et al. | 385/56 |
| 2002/0041738 | A1 | * | 4/2002  | Carberry et al. | 385/56 |
| 2006/0056769 | A1 | * | 3/2006  | Khemakhem et al. | 385/55 |
| 2006/0233496 | A1 | * | 10/2006 | Khemakhem et al. | 385/75 |
| 2007/0196053 | A1 | * | 8/2007  | Kewitsch        | 385/74 |
| 2008/0019642 | A1 | * | 1/2008  | Kewitsch        | 385/72 |
| 2008/0112672 | A1 | * | 5/2008  | Lewallen et al. | 385/58 |

(Continued)

FOREIGN PATENT DOCUMENTS

| WO | WO 2013/179197 | 12/2013 |
| WO | WO 2014-063154 | 4/2014 |
| WO | WO 2015-047508 | 4/2015 |

OTHER PUBLICATIONS

International Search Report for PCT/US2015/064961, dated May 11, 2016, 3 pp.

*Primary Examiner* — Kaveh C Kianni
(74) *Attorney, Agent, or Firm* — Janet A. Kling

(57) ABSTRACT

A ruggedized cable connection structure configured to direct mate first and second ruggedized optical fiber connectors is disclosed. The connection assembly has a housing having a channel extending from a first end of the housing through to the second end of the housing, an adapter secured within the channel near a midpoint of the housing to enable direct mating of the first and second ruggedized optical fiber connectors, and an integral mounting flange extending from the housing to allow connection to a mounting surface.

11 Claims, 21 Drawing Sheets

(56) References Cited

U.S. PATENT DOCUMENTS

| | | | |
|---|---|---|---|
| 2009/0148101 A1* | 6/2009 | Lu et al. | 385/56 |
| 2010/0054668 A1* | 3/2010 | Nelson | 385/78 |
| 2010/0239220 A1 | 9/2010 | Lin et al. | |
| 2010/0247053 A1* | 9/2010 | Cowen et al. | 385/135 |
| 2011/0002586 A1* | 1/2011 | Nhep | 385/62 |
| 2011/0200286 A1* | 8/2011 | Smith et al. | 385/86 |
| 2011/0235979 A1* | 9/2011 | Anderson et al. | 385/78 |
| 2012/0049017 A1 | 3/2012 | Murano et al. | |
| 2012/0294572 A1* | 11/2012 | Petersen | 385/78 |
| 2012/0328257 A1* | 12/2012 | Kowalczyk et al. | 385/135 |
| 2013/0051749 A1 | 2/2013 | Lin et al. | |
| 2013/0170810 A1* | 7/2013 | Badar et al. | 385/135 |
| 2014/0023326 A1* | 1/2014 | Anderson et al. | 385/78 |
| 2014/0205253 A1 | 7/2014 | Yang et al. | |
| 2014/0219615 A1* | 8/2014 | Petersen et al. | 385/88 |
| 2014/0341511 A1* | 11/2014 | Daems et al. | 385/77 |
| 2014/0355936 A1* | 12/2014 | Bund et al. | 385/81 |
| 2014/0369649 A1* | 12/2014 | Allen | 385/75 |
| 2015/0139588 A1 | 5/2015 | Estrada | |
| 2015/0219857 A1* | 8/2015 | Lichoulas et al. | 385/75 |

\* cited by examiner

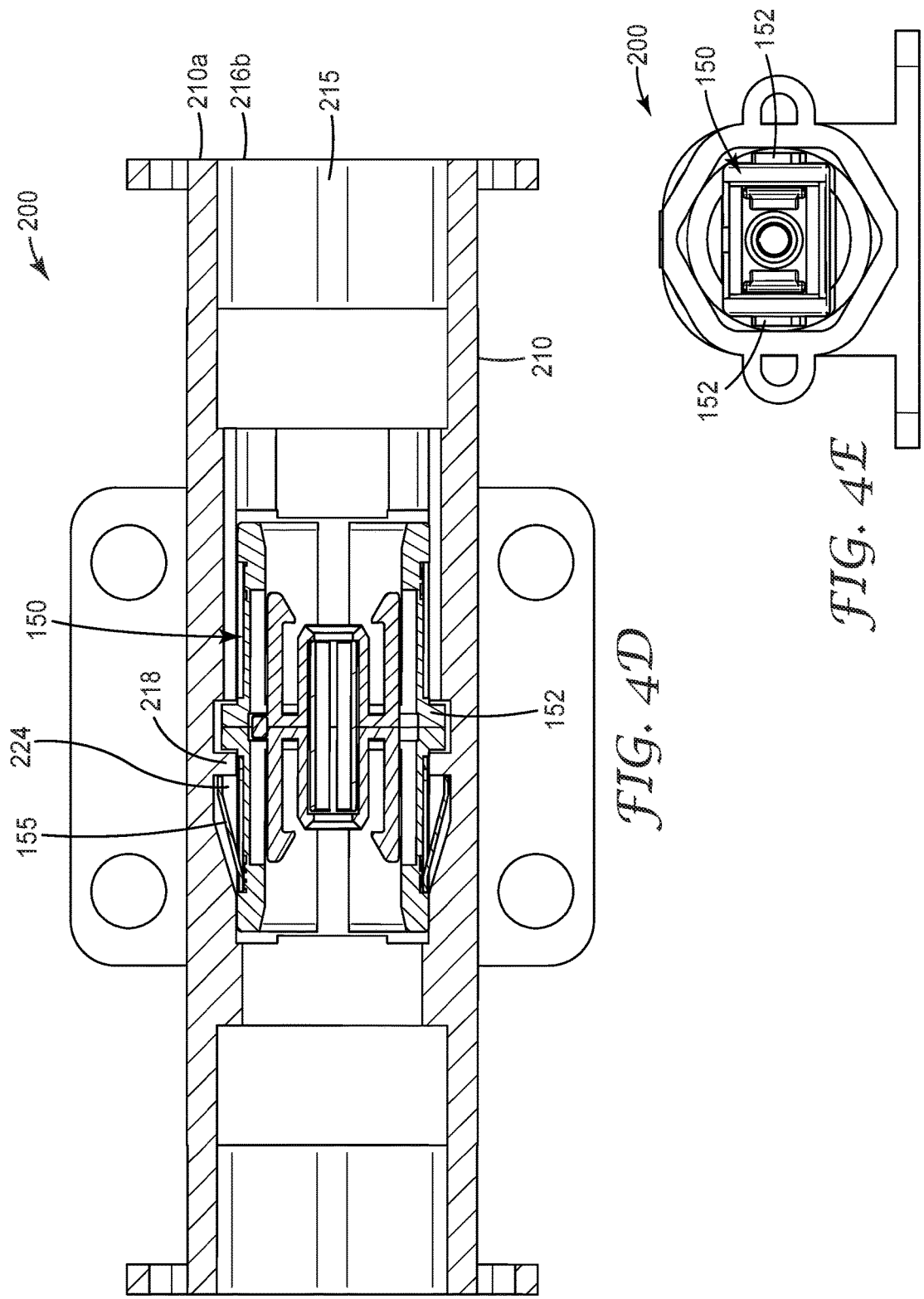

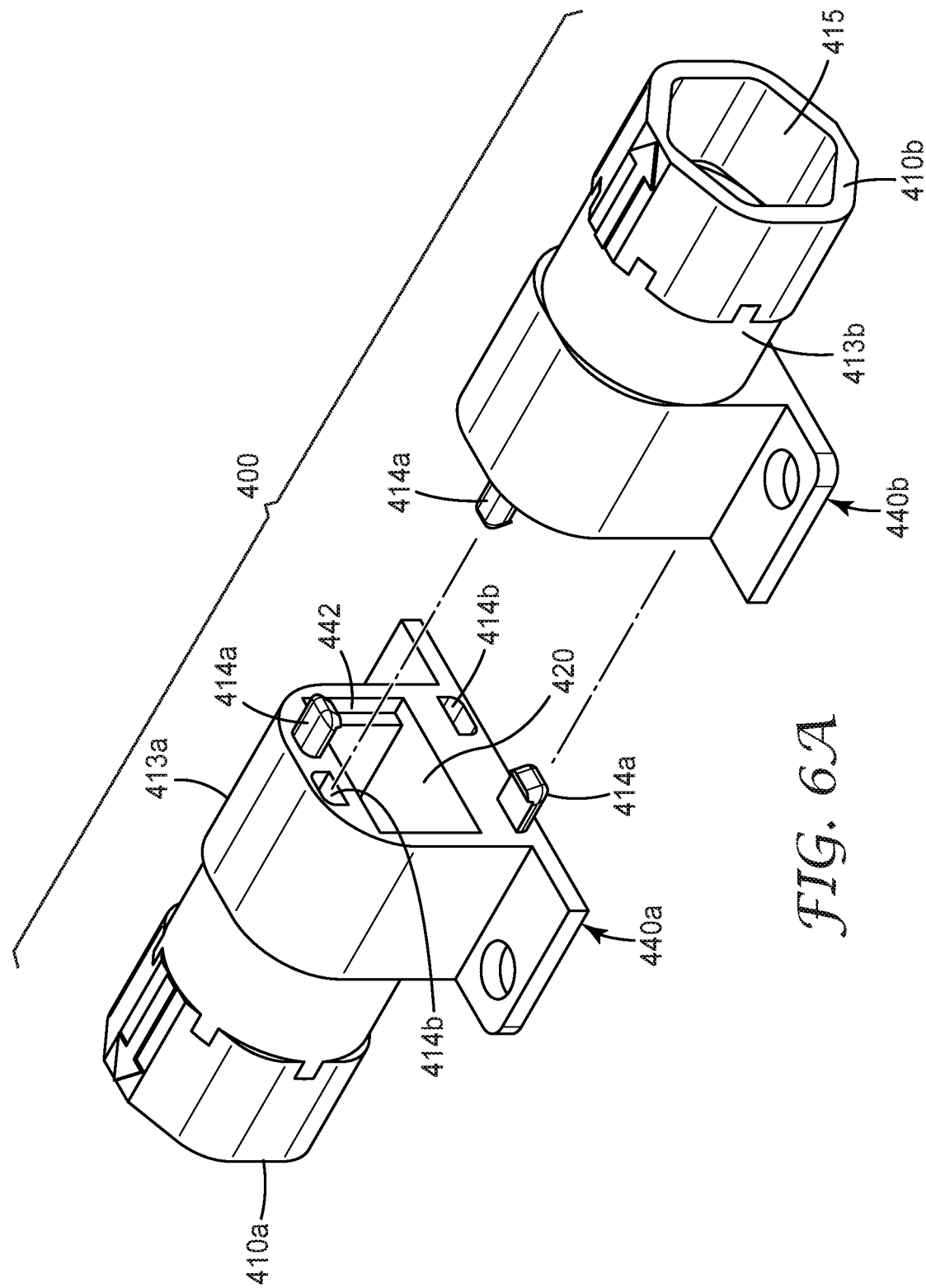

RUGGEDIZED OPTICAL FIBER CONNECTION STRUCTURES AND ASSEMBLIES

FIELD

The present description relates to ruggedized optical fiber connector adapter assemblies to enable interconnection of ruggedized fiber patch cable assemblies. More particularly, the present description relates to ruggedized optical fiber connector adapter assemblies to provide direct connection of ruggedized fiber patch cable assemblies without requiring a separate terminal enclosure or optical network terminal.

BACKGROUND

Telecommunication cables are ubiquitous and used for distributing all manner of data across vast networks and the use of optical fiber cables is growing rapidly in these networks as larger and larger amounts of data are transmitted. In addition to the increasing data transmission rates, the fiber optic network is being extended closer to the end user which can be a premise, business, or a private residence. These networks are often referred to as fiber to the X (FTTX) networks which can include fiber to the premise (FTTP), fiber to the home (FTTH) and fiber to the antenna (FTTA) networks.

Fiber to the Premise (FTTP) and Fiber to the Home (FTTH) markets are rapidly increasing around the world, and the trend is for smaller, less noticeable products for these networks. Conventional FTTP installations utilize fiber terminals to drop services (to provide service connections) to a small number of premises (i.e., 4-12 premises). These fiber terminals are typically located near an end user in a FTTP network to distribute the final service to the end user. The service connection from the fiber terminal is made to the network interface device (NID), located at the end user using a jacketed drop cable. The NID is a small exterior wall mount box at the end user that serves as a test access point as well as a demarcation point. From the NID, another drop cable is passed into the premises and into an outlet box before being finally routed to an optical network terminal by a length of indoor optical fiber cable.

With the large numbers of homes/premises being passed each year, service providers are looking for more cost effective ways of making the final connection to the customer and elimination of one of the bulky boxes in this last portion of the network would be seen as advantageous. Thus, there is a need for a simple low cost demarcation structure that can be placed outside of a customer premise.

SUMMARY

In a first embodiment, a ruggedized cable connection structure configured to direct mate first and second ruggedized optical fiber connectors is described. The connection assembly has a housing having a channel extending from a first end of the housing through to the second end of the housing, an adapter secured within the channel near a midpoint of the housing to enable direct mating of the first and second ruggedized optical fiber connectors, and an integral mounting flange extending from the housing to allow connection to a mounting surface.

In a second embodiment, a ruggedized cable connection is provided. The ruggedized cable connection includes a cable connection structure, a first ruggedized optical fiber connector, and a second ruggedized optical fiber connector. The cable connection structure has a housing comprising a channel extending from a first end of the housing through to the second end of the housing, an adapter secured within the channel near a midpoint of the housing; and an integral mounting flange extending from the housing to allow connection to mounting surface. The first ruggedized optical fiber connector is inserted into the first end of the housing, and the second ruggedized optical fiber connector inserted into the second end of the housing, wherein the first and second ruggedized optical fiber connectors are optically mated within the adapter. The first ruggedized optical fiber connector has a first connection format and the second ruggedized optical fiber connector has a second connection format. In one exemplary aspect, the first connection format is the same as the second connection format. In an alternative aspect, the first connection format is different from the second connection format.

In another aspect, a ruggedized cable connection assembly to direct mate a plurality of pairs of ruggedized optical fiber connectors is described. The cable connection assembly includes a first cable connection structure comprising a first housing comprising a first channel extending from a first end of the first housing through to the second end of the first housing, a first adapter secured within the channel near a midpoint of the first housing; and an interconnection feature structure; and a second cable connection structure comprising a second housing comprising a second channel extending from a first end of the second housing through to the second end of the second housing, a second adapter secured within the second channel near a midpoint of the second; and a complementary interconnection feature. The interconnection feature of the first cable connection structure and the complementary interconnection feature of the second cable connection structure can be engaged to link the first cable connection structure and the second cable connection structure.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

FIGS. 4A-4E are five views of a ruggedized cable connection structure according to a second embodiment the present invention.

FIGS. 6A-6D are four views of a ruggedized cable connection structure according to a fourth embodiment the present invention.

DETAILED DESCRIPTION

Figure 1:
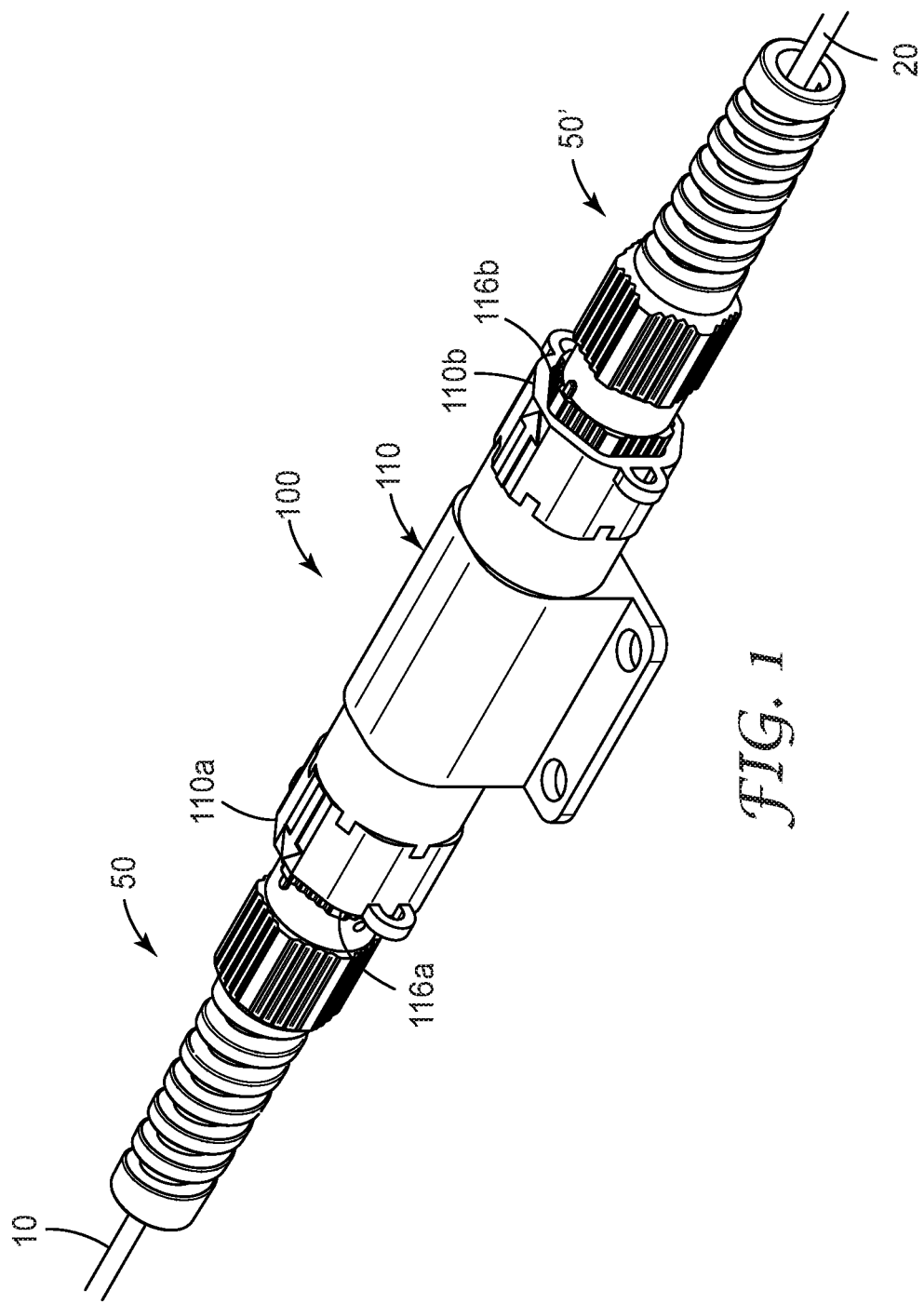
FIG. 1 is an isometric view of a ruggedized cable connection structure configured to direct mate first and second ruggedized optical fiber connectors according to the present description.

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

The exemplary ruggedized fiber cable connection structure described herein can minimize the footprint of the final optical cable connection if FTTH and FTTP networks. In one aspect, the exemplary ruggedized fiber cable connection structure described herein can be a hardened fiber cable connection and test access point with the barest essentials to reduce the cost per connection. The hardened/ruggedized cable connection described herein provides a low profile cable connection solution designed to offer mechanical and environmental protection for the connection. By providing an environmental protection, the ruggedized cable connection structure in conjunction with first and second ruggedized optical fiber connectors can provide a watertight or water resistant seal and/or prevent dust, bugs or any other foreign substance from interfering with the optical connection.

The ruggedized fiber cable connection structure can include a housing with at least one integral interconnection feature such as a mounting flange. Mounting holes in the mounting flange allow simple mechanical attachment to virtually any mounting surface, while the internal portions of the housing act as an adapter/connection point for two mating connectors. In an exemplary aspect, the exemplary ruggedized fiber cable connection structure described herein can be used in place of fiber closures, fiber terminals and even NIDs. The exemplary ruggedized fiber cable connection structure allows two optical connectors to be inserted into the housing from outside of the housing to enable direct mating of the optical connectors in an adapter contained within the housing, thus, eliminating the need to enter the closure/terminal to make the cable connection. Additional optional features can include latching/mating features used for cable retention and pullout resistance for use the ruggedized optical fiber. In one exemplary aspect, a plurality of the exemplary ruggedized fiber cable connection structures can be assembled together such for MDU applications, or they can be attached to a bracket in a handhole for example, DIN-style rail for below grade applications. In another aspect, the exemplary ruggedized fiber cable connection structures can be used in combination with ruggedized field mountable optical fiber connectors for cable repair applications.

The exemplary cable connection solution described herein allows direct cable to cable connections to be made within a protective housing without requiring that the protective housing be opened and without requiring additional connection interfaces from connection with pigtails that might be used to connect two external connection interfaces in a conventional fiber terminal.

One illustrative embodiment of a ruggedized fiber cable connection structure according to the present description is shown in FIG. 1. Ruggedized fiber cable connection structure 100 is configured to direct mate first and second ruggedized optical fiber connectors 50, 50', respectively. In the exemplary aspect shown in FIG. 1, the first and second ruggedized optical connectors can have the same structure. An exemplary ruggedized optical fiber connectors is described in US Publication No. 2014/0355936 and PCT Publication No. WO2015/047508, both of which are incorporated herein in their entirety.

Figure 2:
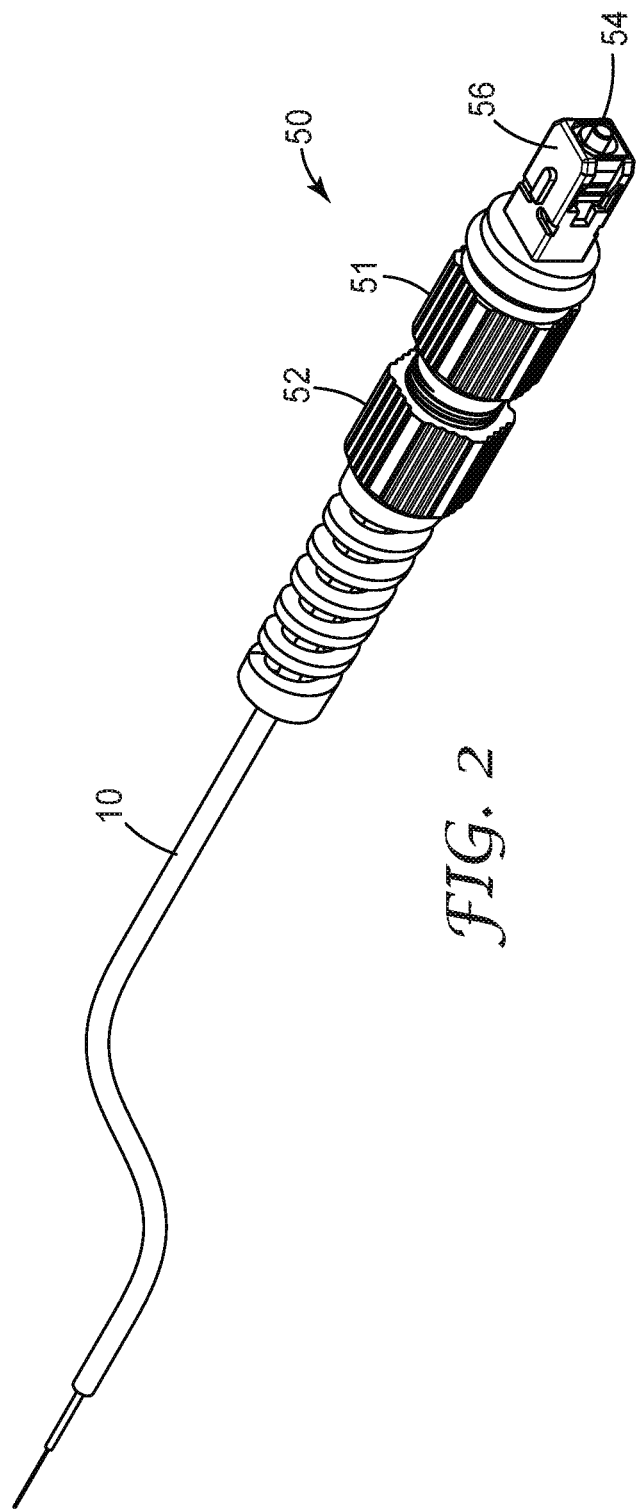
FIG. 2 is an isometric view of an exemplary ruggedized optical fiber connector useable with the ruggedized cable connection structure of FIG. 1.

An exemplary ruggedized optical fiber connector 50 is shown in FIG. 2. Ruggedized optical fiber connector 50 has a main body 51 with an interior passageway extending from a first end to a second end of the main body and a compression member 52 attachable to the second end of the optical fiber connector, an optical connection portion 54 disposed at least partially within the interior of the main body, and an outer housing 56 disposed over the connection portion wherein the outer housing has an external shape mateable with the adapter disposed within the ruggedized fiber cable connection structure as will be described in additional detail below.

The outer housing of the ruggedized optical fiber connector(s) is characterized by a connection format. The connection format can be a conventional known format such as an SC format, an LC format, an FC format or an MPO format. Alternatively, the connection format can be a modified SC format or other non-conventional connector format.

The first ruggedized optical fiber connector 50 has a first connection format, for example an SC format, and is mounted on one end of a fiber cable 10. The second ruggedized optical fiber connector 50' has a second connection format, also an SC format, and is mounted on one end of a fiber cable 20. Because both the first ruggedized optical fiber connector and the second ruggedized optical fiber connector have an SC connection format, a conventional SC adapter 150 (FIG. 3B) can be used to mate the two ruggedized optical fiber connectors.

Exemplary optical fiber cables can include cables with a semi-rigid outer sheath or jacket surrounding at least one optical fiber and can include one or more strength members. The optical fiber or fibers may be enclosed in one or more loose buffer tubes or may be provided as an optical fiber ribbon cable. In one exemplary embodiment, the patch cable may be a flat cable. Each optical fiber has a polymeric coating that surrounds and protects the glass fiber. Examples of exemplary optical fiber cables that can be used in the exemplary patch cable assembly include ResiLink ADF™ All-Dielectric Flat Drop Cable available from Pirelli Cables and Systems (Columbia, N.C.) or EZ DROP cable from Draka (Claremont, N.C.), fiber reinforced plastic (FRP) optical cable available from Shenzhen SDG Information Company, Ltd. (Shenzhen, China), SE*-LW*FTTH All Purpose Optical Drop Cables and SE-8 PureAccess™ Single Mode Optical Fiber each of which is available from Sumitomo Electric (Research Triangle Park, N.C.), Mini DP Flat Drop Cable available from OFS (Northcross, Ga.). The strength members may be either semi-rigid rods or a collection of loose fibers or floss, e.g. made of aramid fibers or glass.

Referring to FIGS. 1, and 3A-3E, the cable connection structure 100 includes a housing 110 having a channel 115 extending from a first end 110a of the housing through to the second end 110b of the housing. In an exemplary aspect, housing 110 can have a generally tubular shape. An adapter 150 can be secured within the channel near a midpoint 111 of the housing to enable direct mating of the first and second ruggedized optical fiber connectors.

The channel can be defined by a characteristic minimum diameter and the adapter has a maximum cross sectional area perpendicular to a connection axis of the adapter, the cross sectional area having a characteristic maximum dimension. In an exemplary aspect, the minimum diameter of the channel is less than the maximum dimension of the cross sectional area of the adapter.

The first ruggedized optical fiber connector 50 can be inserted into channel 115 through the first channel entrance 116a at the first end of the housing 110, and the second ruggedized optical fiber connector 50' can be inserted into channel 115 through the second channel entrance 116b at the second end of the housing. Thus, both the first and second ruggedized connectors can be inserted into the housing from an initial position outside of housing such that there is no need to open or otherwise access the interior of the ruggedized cable connection structure 100. The channel has an interior profile and contour that closely matches the external profile of the ruggedized connectors to be joined therein. Thus, the close fitting profile of the channel enables the channel to guide and align the first and second ruggedized connectors with respect to adapter 150 to ensure a reliable optical connection after mating.

Figure 3A:
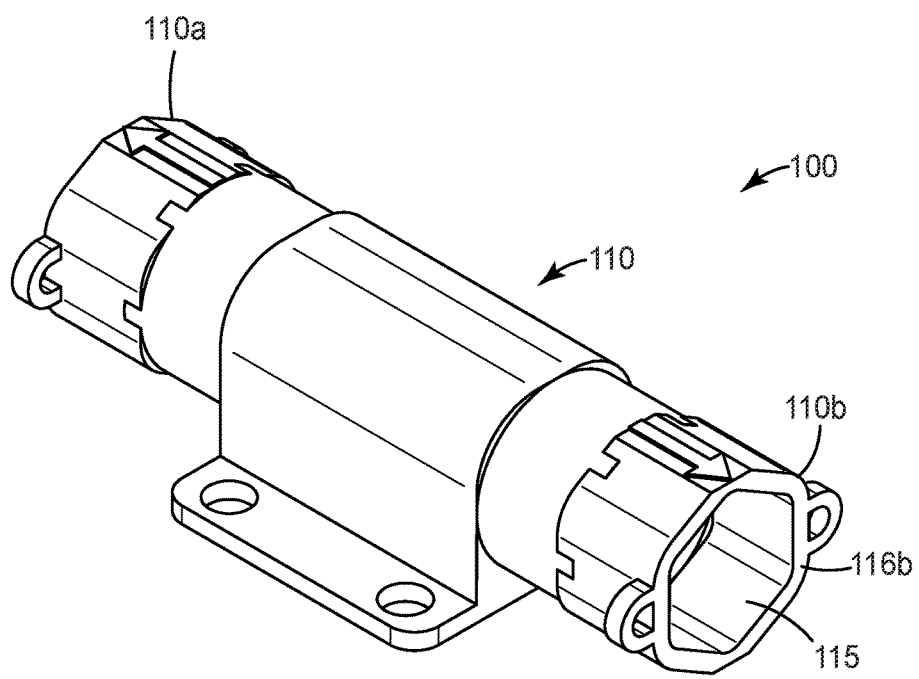
FIGS. 3A-3E are five views of a ruggedized cable connection structure according to a first embodiment the present invention.
Figure 3B:
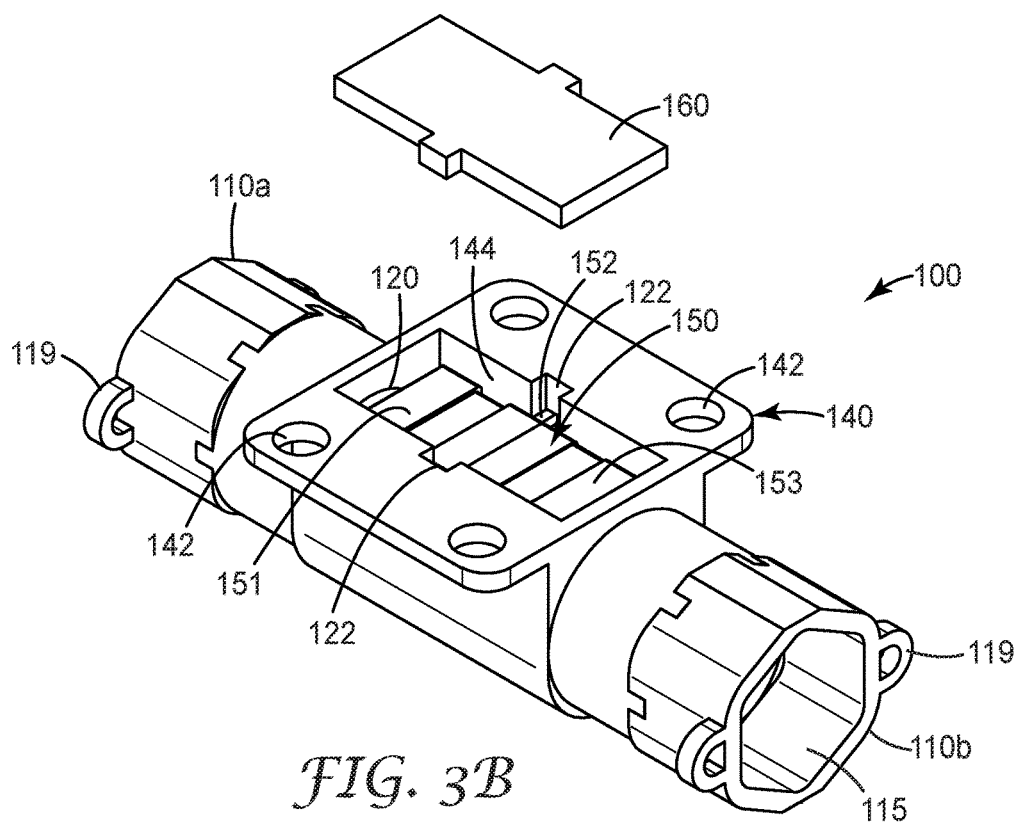
Figure 3C:
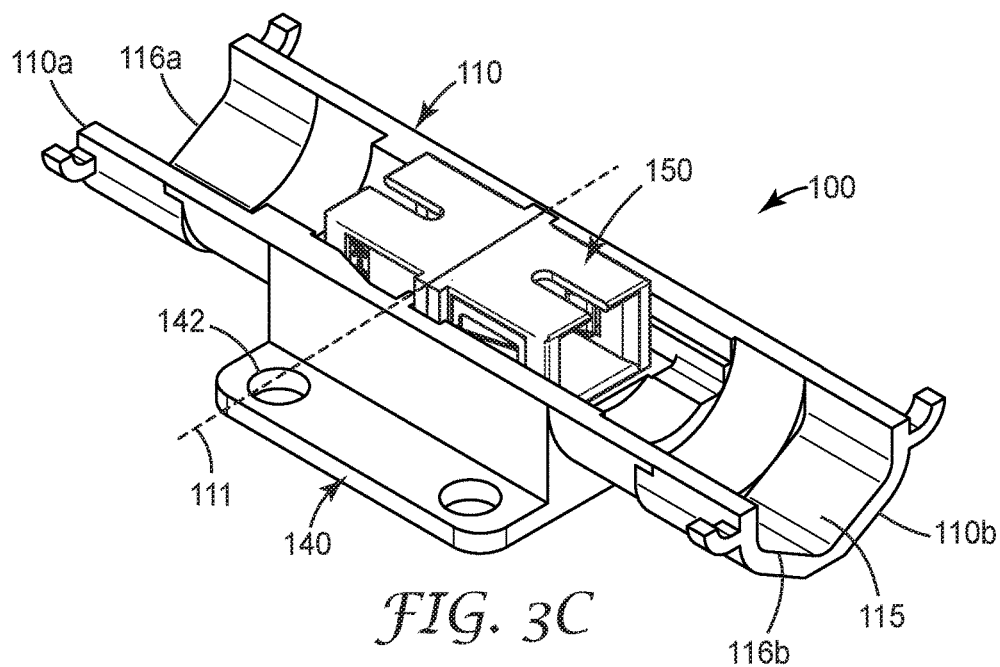
Figure 3D:
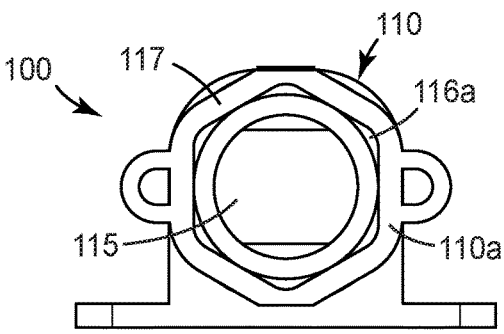

For example FIG. 3D shows an end view of the first end 110a of housing 110 of ruggedized cable connection structure 100, the channel entry 116a can be a hexagonal port portion 117 that is configured to closely fit with the hexagonal external profile of the first ruggedized optical fiber connector shown in FIG. 2. The exemplary channel entry can have other geometric configurations such as a generally cylindrical or tubular shape, a rectangular shape or other polygonal shape so long as the shape closely matches the external profile of the ruggedized optical fiber connector to be inserted therein.

In one aspect, the exemplary ruggedized cable connection structure can provide an aerial midspan cable to cable connection. In another exemplary aspect, ruggedized cable connection structure 100 can include an integral interconnection feature such as mounting flange 140 extending from the housing 110 to allow connection to a mounting surface, such as a wall or ceiling of a building, a bracket in a handhole, or a telephone pole. The flange can have one or more holes 142 through the flange to accommodate a mechanical fastener (e.g. nail, a screw or bolt, not shown) to secure the ruggedized cable connection structure to the mounting surface.

Alternatively, adhesive can be applied to the flange to secure the ruggedized cable connection structure to the mounting surface. For example, a double sided adhesive tape or a transfer adhesive can be applied to the flange. Exemplary adhesive products for this application is the VHB™ adhesive tape product lines that are available from 3M Company (St. Paul, Minn.).

Figure 3E:
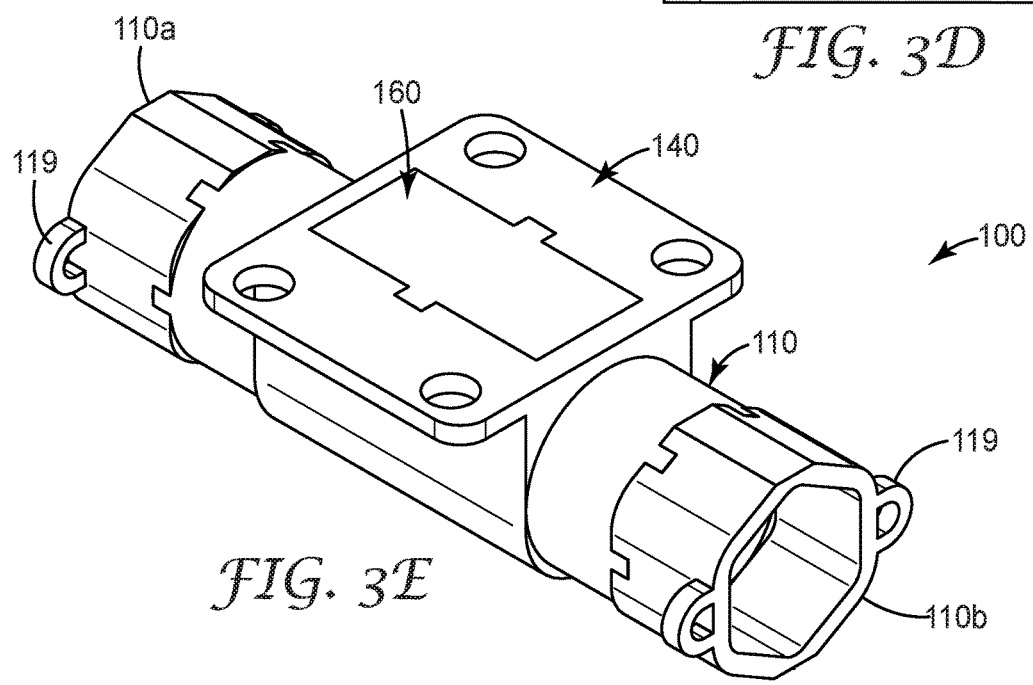

The housing can include a cavity 120 disposed within channel 115 to hold an adapter 150. The cavity has a shape closely configured to the adapter that will be disposed therein. In the exemplary embodiment, the cavity can be accessed through opening 144 in flange 140. The cavity can include a slot 122 on either side of the cavity that is configured to accept the lip disposed of either side of the adapter. Once the adapter has been installed in the cavity as shown in FIG. 3B, a cover can be placed in opening 144 and secured in place as shown in FIG. 3E. The cover can be secured in place by ultrasonic welding or an adhesive when a water tight seal is desired for outdoor installations or by mechanical means when exposure to water is less likely such as interior applications in the basement or access corridors of an MDU or office building.

Adapter 150 includes a first connector housing 151 configured to accept the outer housing 56 (FIG. 2) of the first ruggedized optical fiber connector 50, a second connector housing 153 configured to accept the outer housing of the second ruggedized optical fiber connector; and an alignment sleeve 154 (FIG. 4C) extending between the first and second connector housings along a central axis of the adapter to accept the ferrules of the first and second ruggedized optical fiber connectors. Lip 152 is centrally disposed along the longitudinal axis extending from the side of the adapter near the junction of the first and second connector housing. The adapter can optionally include a clip 155 to secure the adapter within the channel as shown in a second embodiment of a ruggedized cable connection structure 200 shown in FIGS. 4A-4D.

Adapter 150 has a first connection format on a first side of the adapter that is configured to mate with the first ruggedized optical fiber connector and a second connection format on a second side of the adapter that is configured to mate with the second ruggedized optical fiber connector. In one aspect, the first connection format and the second connection format are the same. In an alternative aspect, the first connection format and the second connection format are different. In some embodiments, at least one of the first connection format and the second connection format is an SC format. Alternatively, at least one of the first connection format and the second connection format is an LC format. In yet another alternative, at least one of the first connection format and the second connection format is an MTP/MPO format.

Optionally, ruggedized cable connection structure 100 can include one or more security tabs 119 near the first and second ends 110a, 110b of the housing 110 shown in FIGS. 3B and 3E. The security tabs can provide additional anchoring via a cable tie or other tamper proof tie of the connector within the housing preventing accidental or intentional removal of the ruggedized optical fiber connectors from the ruggedized cable connection structure by unauthorized personnel.

Referring to FIGS. 4A-4E, the ruggedized cable connection structure 200 includes a housing 210 having a channel 215 extending from a first end 210a of the housing through to the second end 210b of the housing. An adapter 150 can be inserted through either the first end or the second end of the housing and secured within the channel near a midpoint 211 of the housing to enable direct mating of the first and second ruggedized optical fiber connectors.

The channel provides sufficient clearance to allow the adapter to be inserted into the channel from one of the first end and the second end of the housing. The channel can be defined by a characteristic minimum diameter and the adapter has a maximum cross sectional area perpendicular to a connection axis of the adapter, the cross sectional area having a characteristic maximum dimension. In an exemplary aspect, the minimum diameter of the channel is between about 1% and about 10% larger than the maximum dimension of the cross sectional area of the adapter.

The channel can define an interior volume of the housing. In an exemplary aspect, the interior volume is less than 6 in$^3$.

In this exemplary embodiment, housing 210 can have a generally tubular shape having a continuous unbroken outer surface (i.e. no openings or seams through a wall of the housing).

Figure 4A:
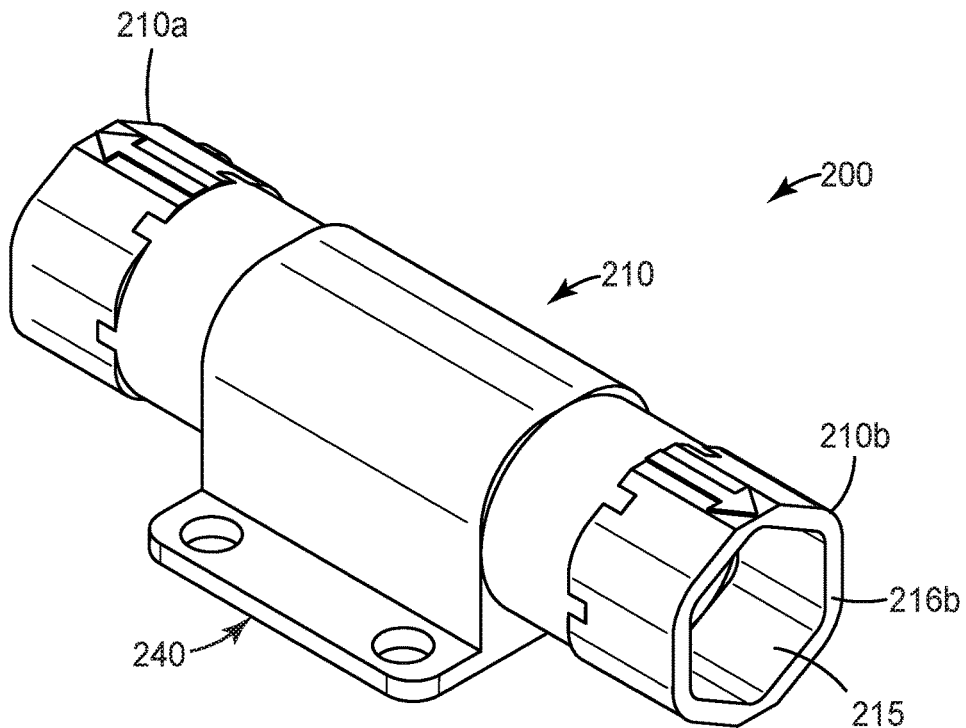
Figure 4B:
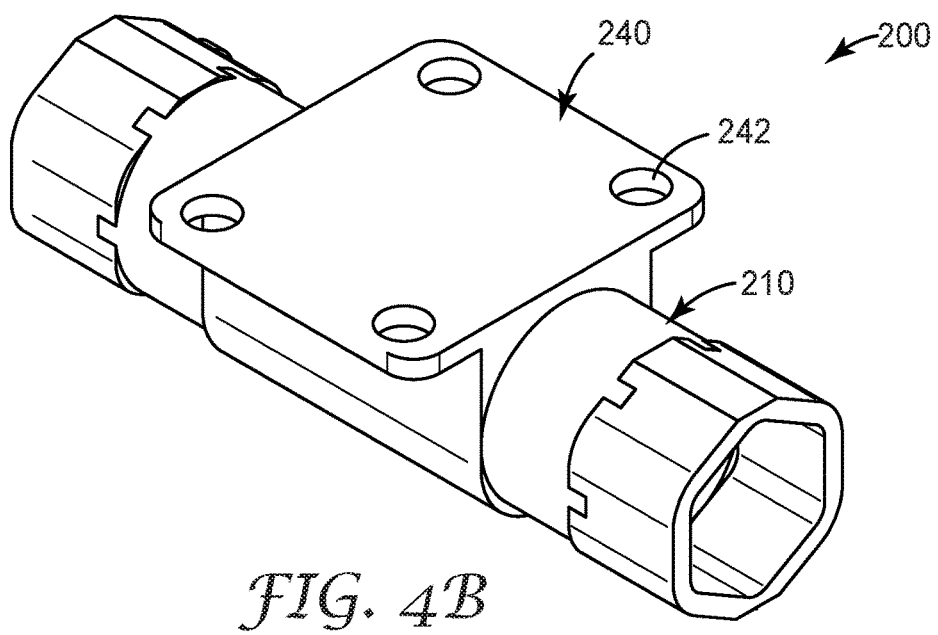
Figure 4C:
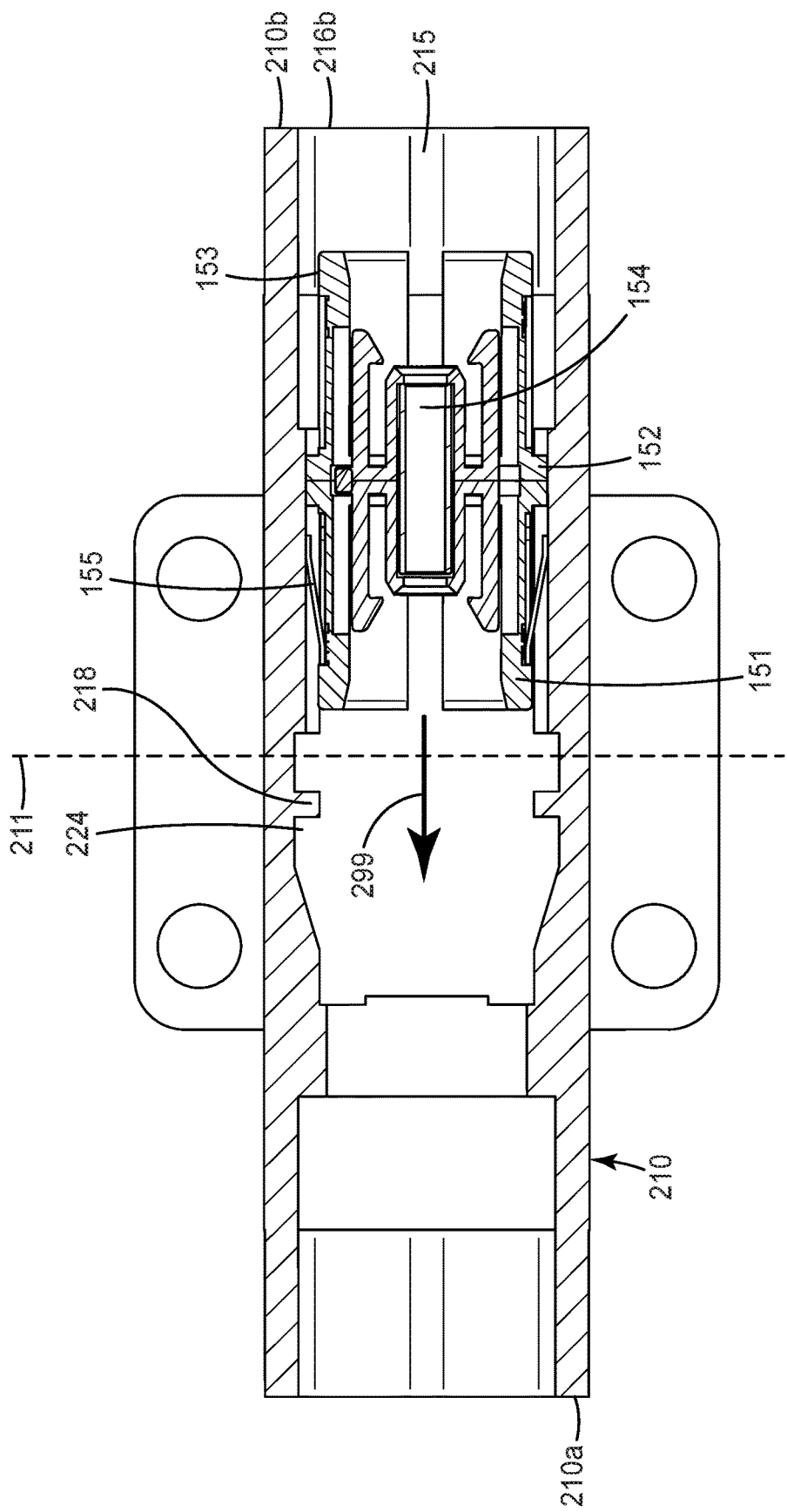

The insertion of adapter 150 into ruggedized cable connection structure 200 will be described with respect to FIGS. 4C-4E. FIGS. 4C and 4D is a cross-sectional top view of ruggedized cable connection structure 200 with adapter 150 partially installed in the housing and fully installed in the housing, while FIG. 4E is an end view of the second end 210b of ruggedized cable connection structure 200 with adapter 150 fully installed in the housing. Second channel entrance and the portion of the channel between the second end of the housing and the midpoint of the housing is sized to allow adapter 150 to be inserted therein. As the adapter moves through the clips 155 are pressed toward the outer surface of the first connector housing 151 to allow the adapter to slip through channel 215 in a direction indicated by arrow 299. The adapter slides forward until lips 152 encounter abutment wall 218 at which time clips 155 are free to expand into clip pockets 224 formed in the inner wall of the channel. Thus adapter 150 is secured in housing 210 by the capture of abutment wall(s) 218 between the lips on the adapter and the clips on the adapter as shown in FIG. 4D.

The first ruggedized optical fiber connector can be inserted into channel 215 through the first channel entrance 216a at the first end of the housing 210, and the second ruggedized optical fiber connector can be inserted into channel 215 through the second channel entrance 216b at the second end of the housing as described previously with respect to the first embodiment of the ruggedized cable connection structure 200. Thus, both the first and second ruggedized connectors can be inserted into the housing from an initial position outside of housing such there is no need to open or otherwise access the interior of the ruggedized cable connection structure 200. The channel has an interior profile and contour that closely matches the external profile of the ruggedized connectors to be joined therein. Thus, the close fitting profile of the channel enables the channel to guide and align the first and second ruggedized connectors with respect to adapter 150 to ensure a reliable optical connection after mating.

In one aspect, the exemplary ruggedized cable connection structure can provide an aerial midspan cable to cable connection. In another exemplary aspect, ruggedized cable connection structure 200 can include an interconnection feature such as integral mounting flange 240 extending from the housing 210 to allow connection to a mounting surface, such as a wall or ceiling of a building, a bracket in a handhole, or a telephone pole. The flange can have one or more holes 242 through the flange to accommodate a mechanical fastener (e.g. nail, a screw or bolt, not shown) to secure the ruggedized cable connection structure to the mounting surface. Alternatively, a double sided adhesive tape or a transfer adhesive can be applied to the flange to secure the ruggedized cable connection structure to the mounting surface.

Referring to FIGS. 5A-5D, the ruggedized cable connection structure 300 includes a housing 310 having a channel 315 extending from a first end 310a of the housing through to the second end 310b of the housing. In this exemplary embodiment, housing 310 can be longitudinally split to form a first housing portion 313a and a second housing portion 313b. In one aspect, the first and second housing portions can be separate pieces that when secured together housing 310 has a generally tubular shape. Alternatively, the first and second housing portions can be attached to one another by a hinge 313c disposed along one longitudinal edge that when closed and secured together housing 310 has a generally tubular shape. In an exemplary aspect, the first housing portion and the second housing portion are connected by a living hinge disposed along their first edges and wherein the first housing portion and the second housing portion are permanently connected along their second edges via an adhesive or via a welding process.

Figure 5A:
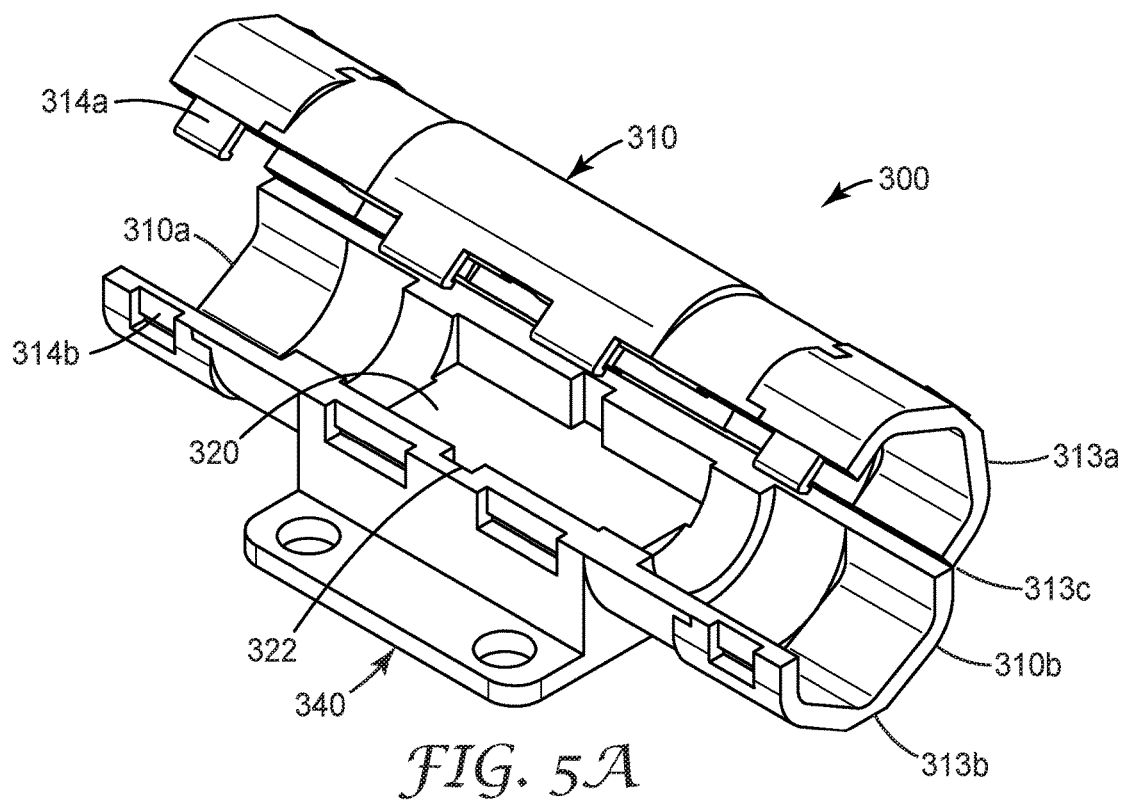
FIGS. 5A-5D are four views of a ruggedized cable connection structure according to a third embodiment the present invention.
Figure 5B:
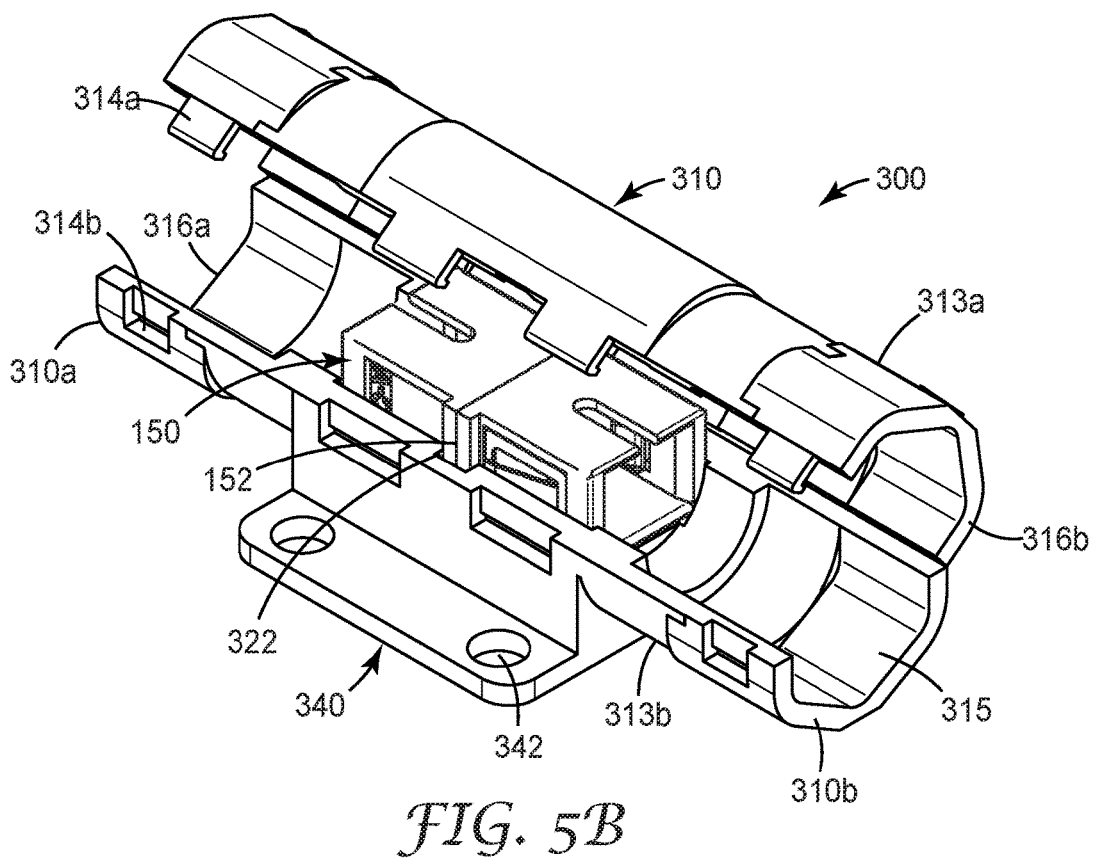
Figure 5C:
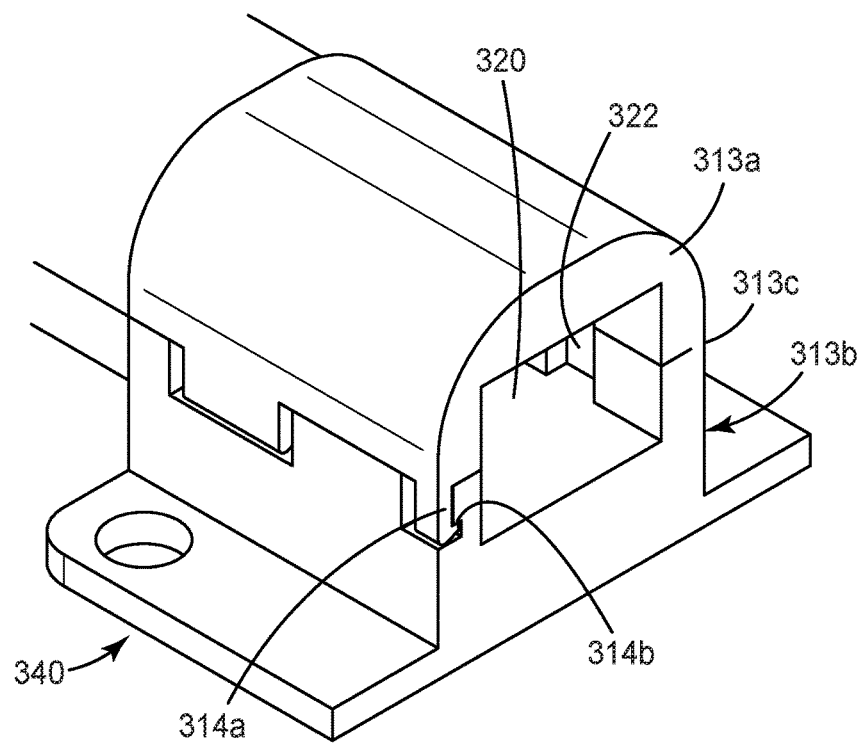
Figure 5D:
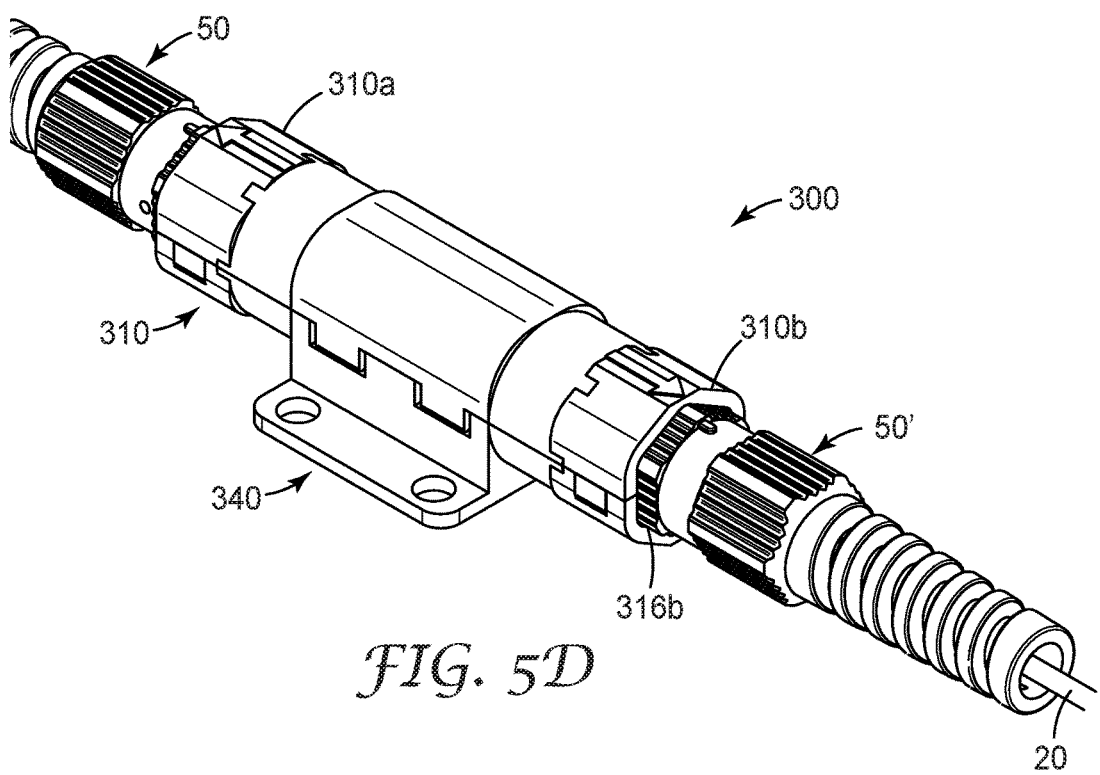

FIGS. 5A and 5B show ruggedized cable connection structure in an open configuration and FIGS. 5C and 5D show ruggedized cable connection structure in an open configuration.

Housing 310 can include a cavity 320 disposed within channel 315 to hold an adapter 150 when the first and second housing portions 313a, 313b are secured together. The cavity has a shape closely configured to the adapter that will be disposed therein. The cavity can include a slot 322 on either side of the cavity that is configured to accept the lip 152 disposed of either side of the adapter. Once the adapter has been installed in the cavity in second housing portion as shown in FIG. 5B, the first housing portion can be secured to the second housing portion secured in place as shown in FIGS. 5C and 5D. In an exemplary aspect, the first housing portion and the second housing portion can be permanently connected to first housing portion around the adapter. For example, the first and second housing portions can be secured together by ultrasonic welding or an adhesive, by mechanical means or a combination of these closure methods.

In one exemplary aspect, housing 310 can have one or more latch arms 314a extending from a longitudinal end of the first housing portion and corresponding catch features 314b along a longitudinal edge of the second housing portion. The latch and catch securing mechanism can be used when exposure to water is less likely such as interior applications in the basement or access corridors of an MDU or office building, or it can be combined with ultrasonic welding, an adhesive or a gasket to improve the environmental protection for outdoor use.

The first ruggedized optical fiber connector 50 can be inserted into channel 315 through the first channel entrance 316a at the first end of the housing 310, and the second ruggedized optical fiber connector 50' can be inserted into channel 315 through the second channel entrance 316b at the second end of the housing as described previously with respect to the first embodiment of the ruggedized cable connection structure 300 as shown in FIG. 5D. Thus, both the first and second ruggedized connectors can be inserted into the housing from an initial position outside of housing such there is no need to open or otherwise access the interior of the ruggedized cable connection structure 300. The channel has an interior profile and contour that closely matches the external profile of the ruggedized connectors to be joined therein. Thus, the close fitting profile of the channel enables the channel to guide and align the first and second ruggedized connectors with respect to adapter 150 to ensure a reliable optical connection after mating.

Ruggedized cable connection structure 300 can also include an interconnection feature such as integral mounting flange 340 extending from one of the first and second housing portions 313a, 313b to allow connection to a mounting surface. The flange can have one or more holes 342 through the flange to accommodate a mechanical fastener (e.g. nail, a screw or bolt, not shown) to secure the ruggedized cable connection structure to the mounting surface. Alternatively, a double sided adhesive tape or a transfer adhesive can be applied to the flange to secure the ruggedized cable connection structure to the mounting surface.

Referring to FIGS. 6A-6D, the ruggedized cable connection structure 400 includes a housing 410 having a channel 415 extending from a first end 410a of the housing through to the second end 410b of the housing. In this exemplary embodiment, housing 410 can be split perpendicular to and at the midpoint of the longitudinal axis of the housing forming a first housing portion 413a and a second housing portion 413b. In an exemplary aspect, the first and second housing portions can be identical hermaphroditic pair. In one aspect, the first and second housing portions can be separate pieces that when secured together housing 410 has a generally tubular shape.

Housing 410 can include a cavity 420 disposed within channel 415 to hold an adapter 150 when the first and second housing portions 413a, 413b are secured together. The cavity has a shape closely configured to the adapter that will be disposed therein. Half of the cavity will reside in each of the first and second housing portion. Each half cavity will have a depressed ledge 422 which will form a slot that is configured to accept the lip 152 when the first housing portion is secured to the second housing portion. Once the adapter has been installed in one of the half cavities in either the first or second housing portion, the other housing portion can be secured in place to form housing 410. In an exemplary aspect, the first housing portion and the second housing portion are permanently connected to first housing portion around the adapter. For example, the first and second housing portions can be secured together by ultrasonic welding or an adhesive, by mechanical means or a combination of these closure methods. In one exemplary aspect, housing 410 can have one or more latch arms 414a extending from the end face of the housing portion and corresponding catch features 414b formed in said end face. In an exemplary aspect the latch arm and catches can be disposed in such a manner that the first and second housing portions are hermaphroditic. The latch and catch securing mechanism can be used when exposure to water is less likely such as interior applications in the basement or access corridors of an MDU or office building, or it can be combined with ultrasonic welding, an adhesive or a gasket to improve the environmental protection for outdoor use.

Figure 6B:
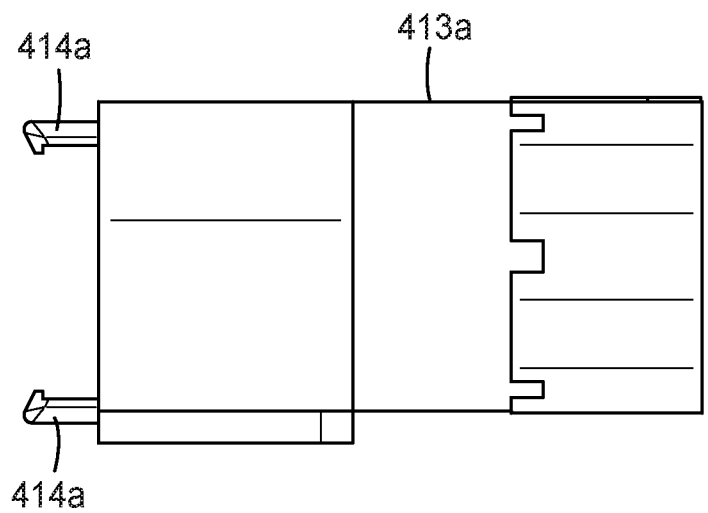
Figure 6C:
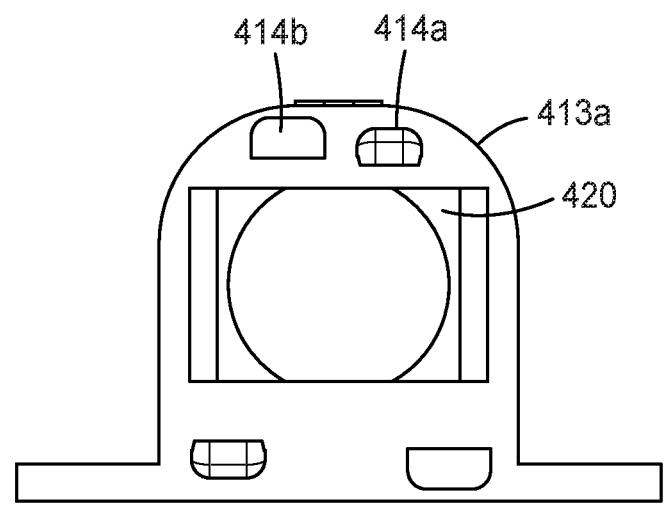
Figure 6D:
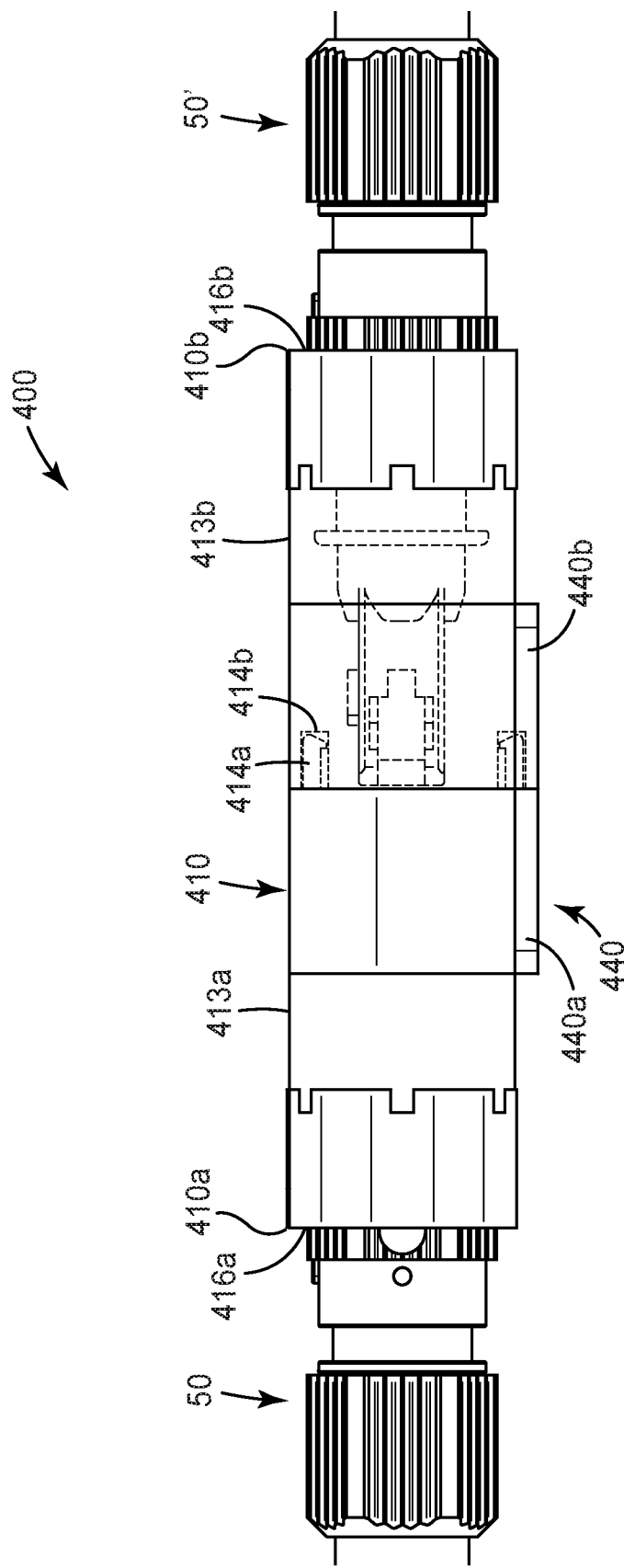

The first ruggedized optical fiber connector 50 can be inserted into channel 415 through the first channel entrance 416a at the first end 410a of the housing 410, and the second ruggedized optical fiber connector 50' can be inserted into channel 415 through the second channel entrance 416b at the second end of the housing 410b as described previously with respect to the first embodiment of the ruggedized cable connection structure 400 as shown in FIG. 6D. Thus, both the first and second ruggedized connectors can be inserted into the housing from an initial position outside of housing such that there is no need to open or otherwise access the interior of the ruggedized cable connection structure 400. The channel has an interior profile and contour that closely matches the external profile of the ruggedized connectors to be joined therein. Thus, the close fitting profile of the channel enables the channel to guide and align the first and second ruggedized connectors with respect to adapter 150 to ensure a reliable optical connection after mating.

Ruggedized cable connection structure 400 can also include an interconnection feature such as integral mounting flange 440 which is formed from flange portions 440a, 440b that extend from the first and second housing portions 413a, 413b, respectively, to allow connection to a mounting surface, as described previously.

Figure 7A:
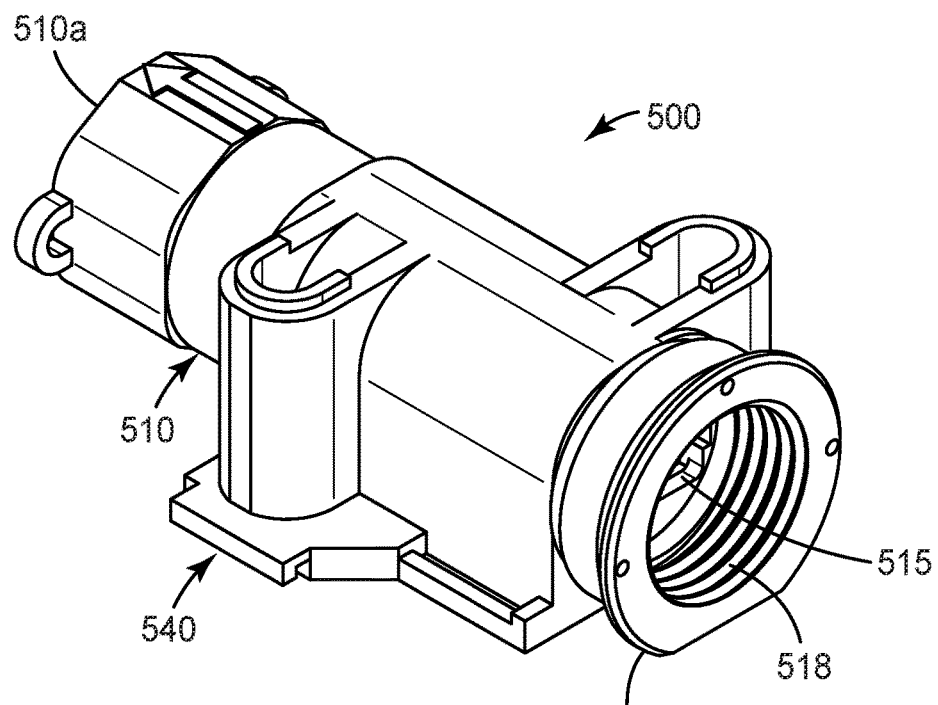
FIGS. 7A-7C are three views of a ruggedized cable connection structure according to a fifth embodiment the present invention.
Figure 7B:
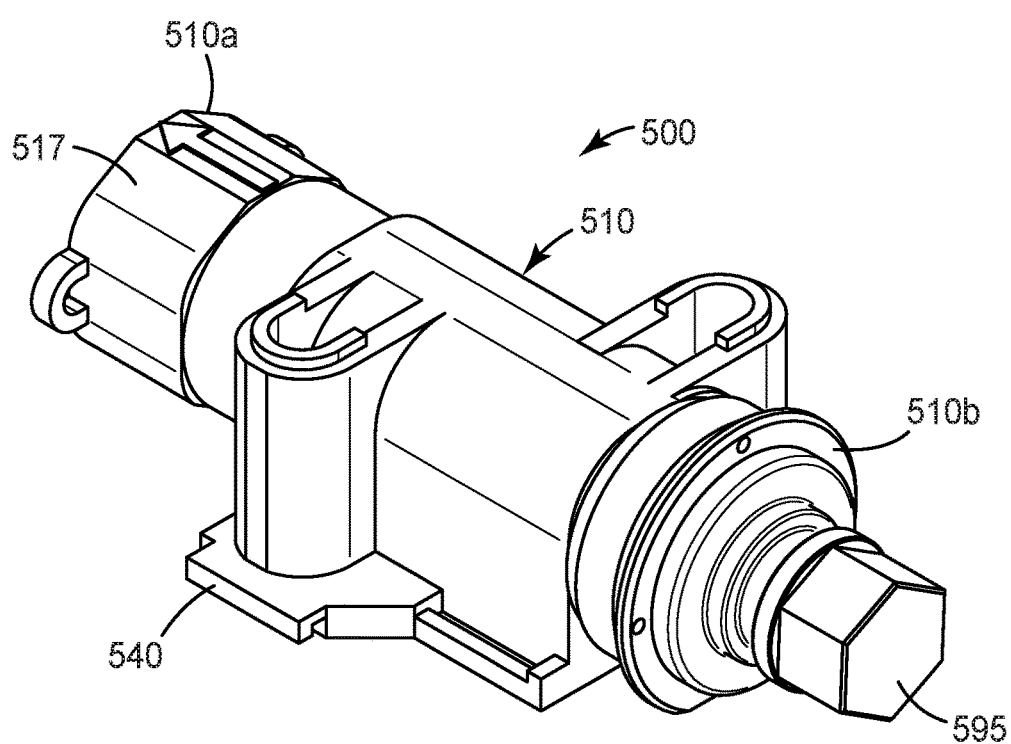
Figure 7C:
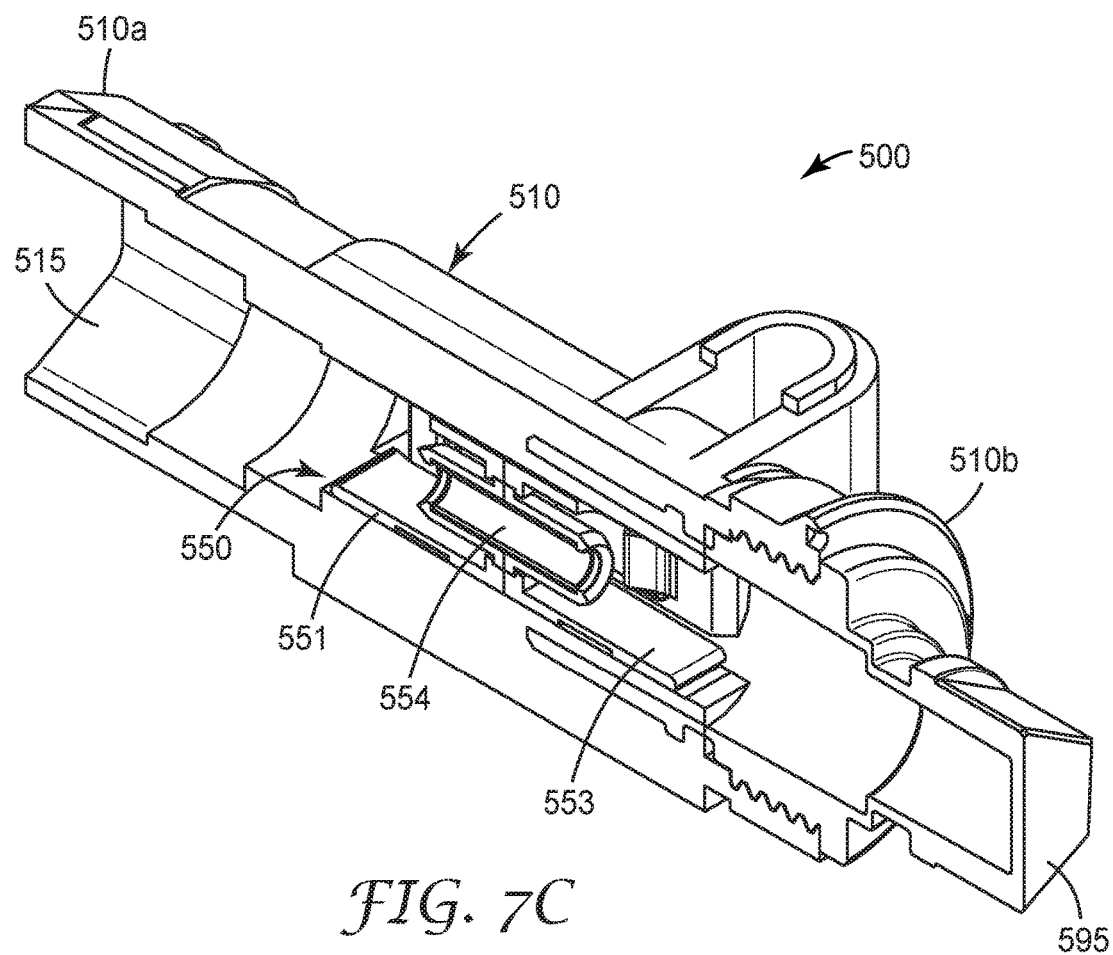

Referring to FIGS. 7A-7C, the ruggedized cable connection structure 500 is an example of a hybrid connection structure that is configured for direct mating of two ruggedized optical fiber connectors which have different connection formats. Cable connection structure 500 includes a housing 510 having a channel 515 extending from a first end 510a of the housing through to the second end 510b of the housing. A hybrid adapter 550 can be disposed within the channel through the housing.

Adapter 550 includes a first connector housing 551 having a first connector format that is configured to accept the outer housing 56 (FIG. 2) of the first ruggedized optical fiber connector 50, a second connector housing 553 having a second connector format that differs from the first connector format that is configured to accept the outer housing of the second ruggedized optical fiber connector; and an alignment sleeve 554 (FIG. 7C) extending between the first and second connector housings along a central axis of the adapter to accept the connection portion 154, specifically the ferrule of the connection portion of the first and second ruggedized optical fiber connectors. For example, the first ruggedized optical fiber connector can have a standard SC connection format such as ruggedized optical fiber connector 50 shown in FIG. 2 and the second ruggedized optical fiber connector can have a modified SC-connection format such as is used in OptiTap® Connector available from Corning Cable Systems, Inc., (Hickory, N.C.).

The housing 510 of the ruggedized cable connection structure 500 may also contain features that enable proper seating of a ruggedized optical fiber connector within the housing. For example, the first end 510a of the housing can have a hexagonally shaped channel entry 517 that is configured to closely mate with the hexagonal body of ruggedized optical fiber connector 50. Similarly, housing can have internal threads 518 within the channel adjacent to the second end 510b of the housing which are configured to mate with external threads on an OptiTap® Connector.

In FIG. 7B, ruggedized cable connection structure 500 is fitted with an optional plug 595 disposed in the second end of the housing. While a single plug is shown, it may be desirable to provide the ruggedized cable connection structure with a plug disposed in either end of the housing which can be useful if the ruggedized cable connection structure is installed on a mounting surface prior to a cable connection being made. At a later time the installer can simply remove the plug(s) and plug in the ruggedized optical fiber connectors to make the service connection. If service is discontinued, one of the ruggedized optical fiber connectors can be removed and replaced by a plug to insure that the interior of the housing remains clean and dry.

The ruggedized cable connection structure can be configured for used with other exemplary ruggedized optical fiber connectors, such as DLX™ Hardened Fiber Connectors available from TE Connectivity (Berwyn, Pa.), Fieldshield Hardened Connectors available from Clearfield (Plymouth, Minn.) and IP-SERIES fiber-optic connector available from Senko Advanced Components, Inc. (Marlboro, Mass.) and are considered to be within the scope of the current disclosure.

Ruggedized cable connection structure 500 can also include an integral interconnection feature such as mounting flange 540 extending from housing 510 to allow connection to a mounting surface.

Figure 8:
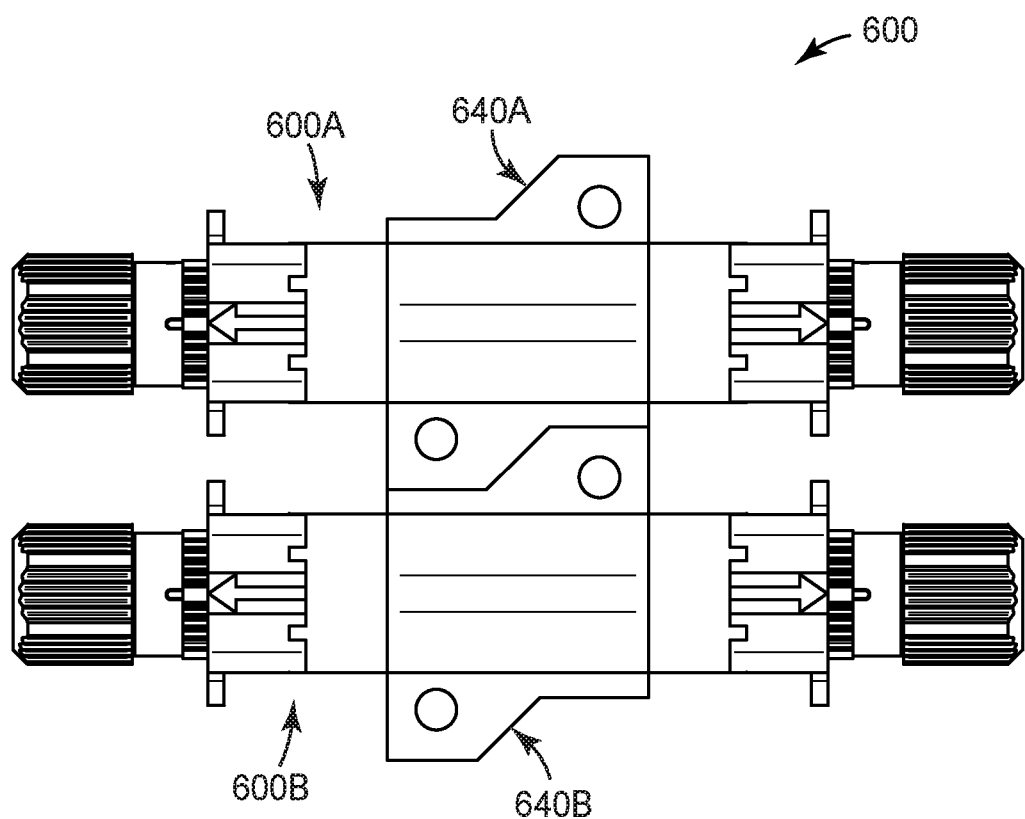
FIG. 8 is a top view of a ruggedized cable connection assembly that comprises two ruggedized cable connection structures that can be used to direct mate a plurality of pairs of ruggedized optical fiber connectors according to an aspect of the present invention.

Mounting flange 540 can include one or more interlocking structures to enable interconnection of a plurality ruggedized cable connection structure. For example, FIG. 8 shows a ruggedized cable connection assembly 600 that includes first and second ruggedized cable connection structures 600A, 600B. First and second ruggedized cable connection structures are similar to ruggedized cable connection structure 100 in that they have a housing and a flange extending from the housing, and as such will not be described here in detail. Attention will focus on the new features of ruggedized cable connection structures 600A, 600B. In contrast to the rectangular shaped flange 140 of ruggedized cable connection structure 100, each of ruggedized cable connection structures 600A, 600B include a flange 640A, 640B having an interlocking shape the helps align adjacent ruggedized cable connection structures while minimizing the footprint of the ruggedized cable connection assembly. This is an example of a positional alignment mechanism.

Figure 9A:
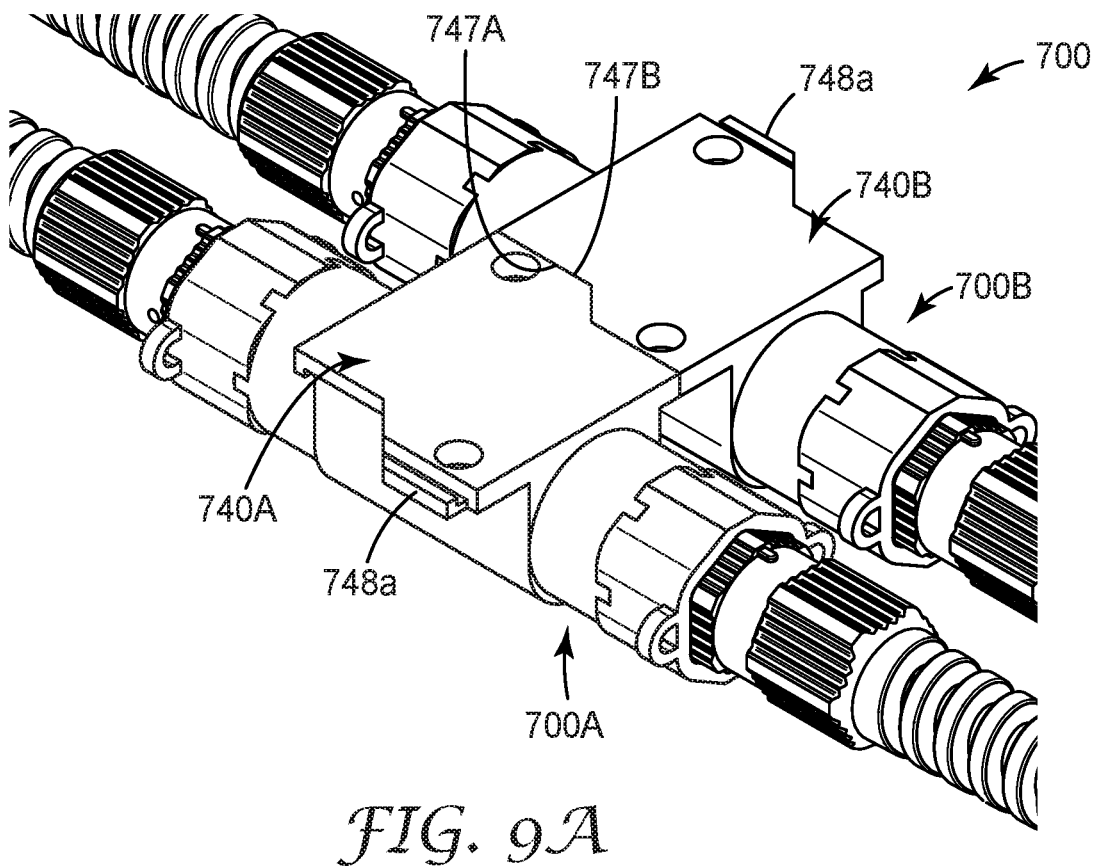
FIGS. 9A-9B are two views of a ruggedized cable connection assembly that comprises two ruggedized cable connection structures that can be used to direct mate a plurality of pairs of ruggedized optical fiber connectors according to an aspect of the present invention.
Figure 9B:
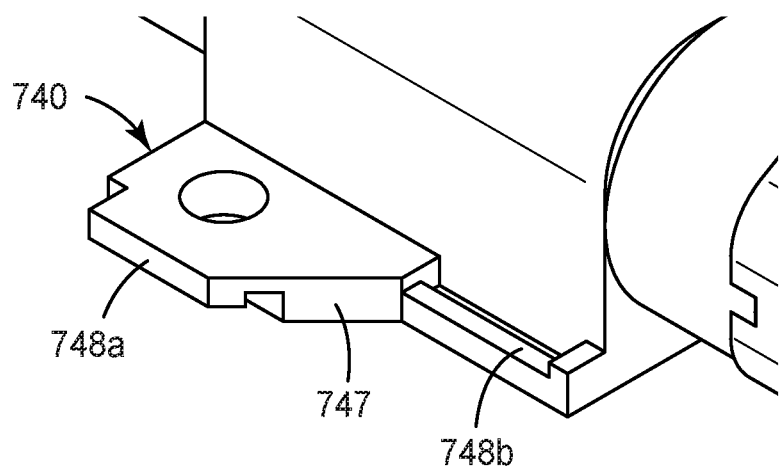

In an alternative embodiment shown in FIGS. 9A and 9B, ruggedized cable connection assembly 700 includes mechanical interlocking structures can be added to the flange to allow mechanical interlocking of ruggedized cable connection structures 700A, 700B. For example, flange 740A, 740B can have a linking edge 747A, 747B wherein at least a portion of the linking edge is parallel to the longitudinal axis of the ruggedized cable connection structure. In one exemplary aspect, the linking edge can have a stepped configuration that can be characterized by a latch portion 748A and a catch portion 748B (best shown in FIG. 7B). The latch portion on the flange of one cable connection structure can be seated in the catch portion of an adjacent cable connection structure to mechanically interlock the first and second cable connection structures in a side by side configuration.

Figure 10A:
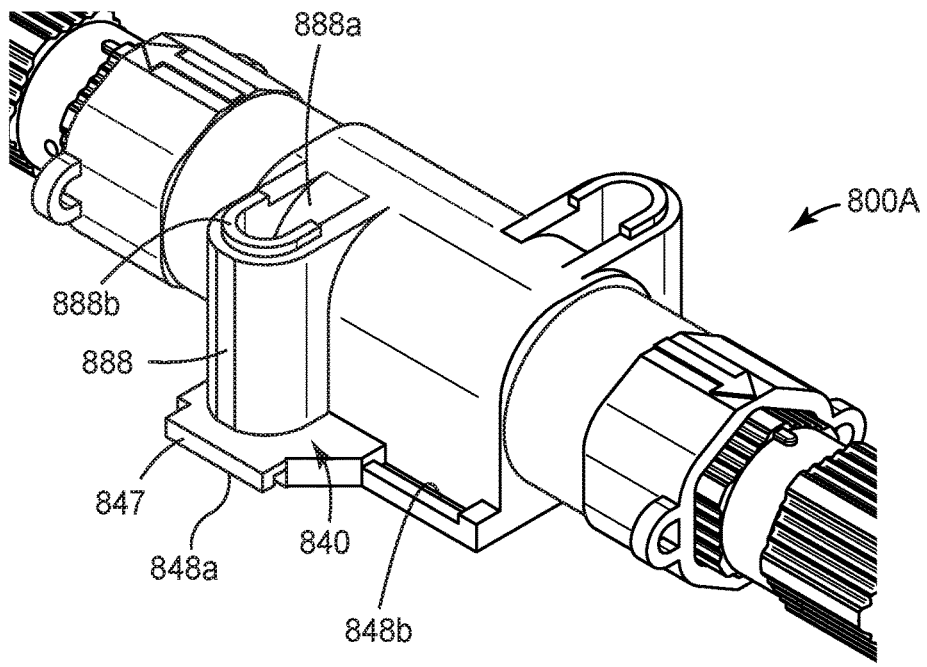
FIGS. 10A-10D are four views of another ruggedized cable connection assembly that comprises four ruggedized cable connection structures that can be used to direct mate a plurality of pairs of ruggedized optical fiber connectors according to an aspect of the present invention.
Figure 10B:
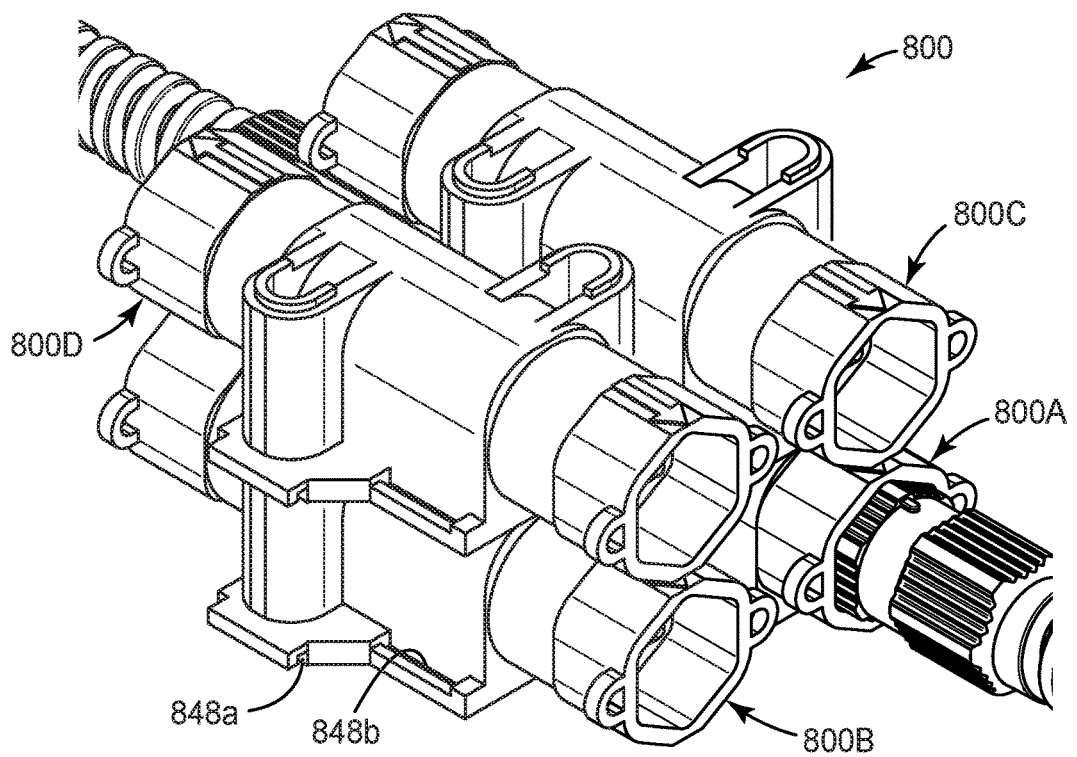
Figure 10C:
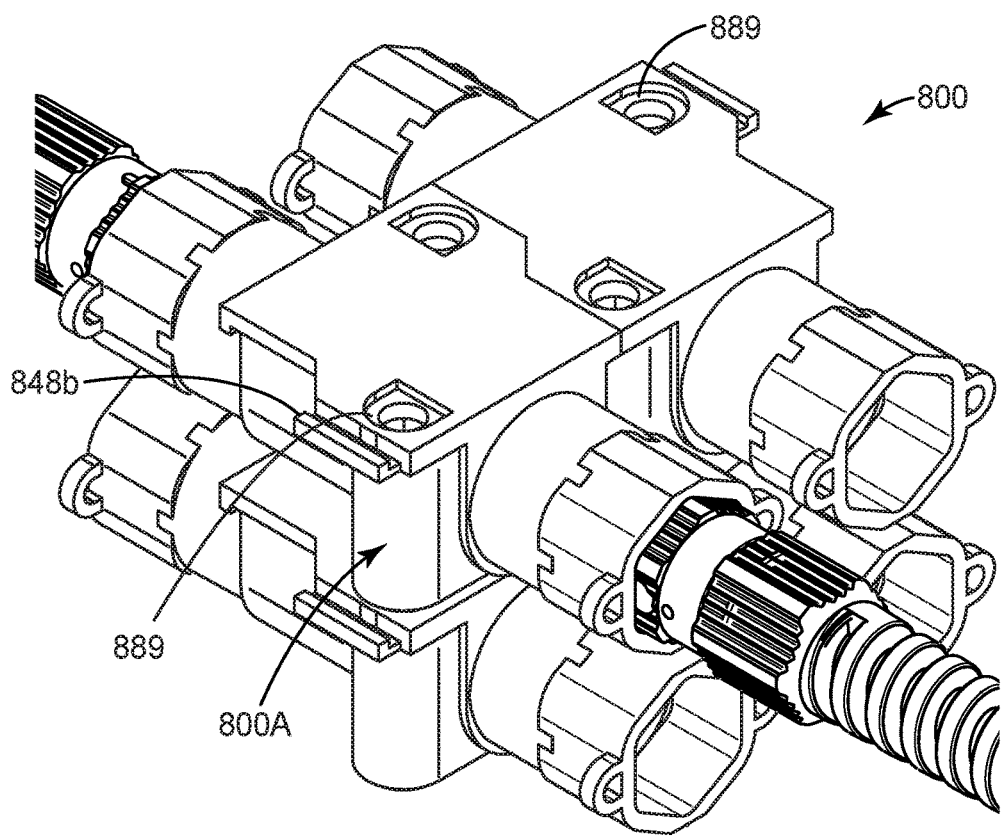
Figure 10D:
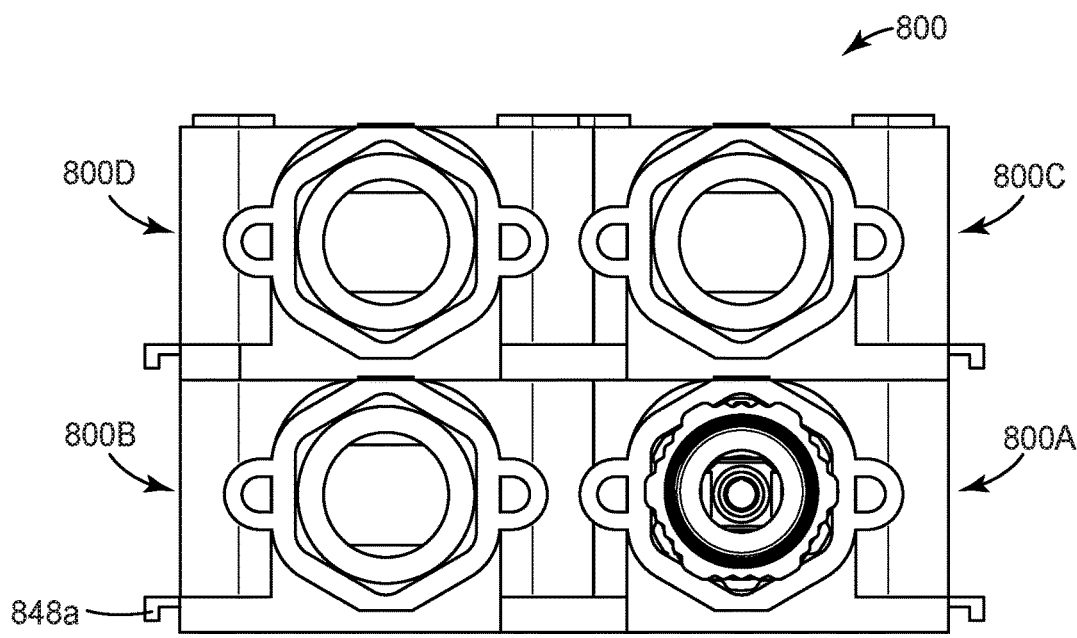

When a larger number of cable connection structures or higher density of cable connection structure are required for a particular installation a stacking interconnection feature such as a vertical alignment guide can be added to the exemplary cable connection structures as shown in cable connection structures 800A-800D shown in FIGS. 10A-10D. In particular, FIG. 10A shows an exemplary cable connection structure 800A that can be assembled in combination with other cable connection structures (800B, 800C, 800D shown in FIG. 10B) of the same type into a high density cable connection assembly 800. FIGS. 10B, 10C and 10D show an isometric top view, an isometric bottom view and an end view of high density cable connection assembly 800.

In the exemplary aspect shown in FIG. 10A, exemplary cable connection structure 800A includes a vertical alignment guide 888 to enable stacking of a second cable connection structure 800C on top of the cable connection structure 800A as shown in FIG. 10B. Vertical alignment guide 888 can have a bore 888*a* extending therethrough to allow insertion of a mechanical fastener (not shown). In an exemplary aspect, the mechanical fastener that is inserted through the vertical alignment guide can also be used to attach cable connection assembly 800 to a mounting surface. The cable connection assembly 800 can include a lip 888*b* around the entrance of the bore through the vertical alignment guide on a first cable connection structure that can interact with a matching depression or receptacle 889 (shown on the bottom of connection structure 800A in FIG. 10C) within the bottom of a flange of a second cable connection structure to form cable connection assembly 800. In an exemplary aspect, the lip on the first cable connection structure and the receptacle on the second cable connection structure can allow assembly of the first cable connection structure and the second cable connection structure into a signal unit via a mechanical interference or snap fit. This allows the first and second cable connection structures to be dry fit together prior to attaching the cable connection assembly to the mounting surface.

In another aspect, flanges 840 of cable connection structures 800A-800D can also include at least one interlocking structure that can engage with a complementary interlocking structure to link two or more cable connection structures in a side by side configuration. For example, the interlocking structure such as latch portion 848A on one cable connection structure that engages with a catch portion 848B on another cable connection structure. The latch portion on the flange of one cable connection structure can be seated in the catch portion of an adjacent cable connection structure to mechanically interlock the first and second cable connection structures in a side by side configuration. In an exemplary aspect, each cable connection structures 800A-800D can include both a latch portion and a catch portion on both linking edges 847 of flange 840.

In one exemplary embodiment, a ruggedized cable connection assembly to direct mate a plurality of pairs of ruggedized optical fiber connectors can include includes a first cable connection structure comprising a first housing comprising a first channel extending from a first end of the first housing through to the second end of the first housing, a first adapter secured within the channel near a midpoint of the first housing; and an interconnection feature; and a second cable connection structure comprising a second housing comprising a second channel extending from a first end of the second housing through to the second end of the second housing, a second adapter secured within the second channel near a midpoint of the second; and a complementary interconnection feature. The interconnection feature of the first cable connection structure and the complementary interconnection feature of the second cable connection structure can be engaged to link the first cable connection structure and the second cable connection structure. In one aspect the interconnection feature can be disposed on the housing while in another aspect the interconnection feature can be interlocking structures disposed on a flange that extends from the housing.

The first cable connection structure can be configured to direct mate a first ruggedized connector to a second ruggedized connector and the second cable connection structure can configured to direct mate a third ruggedized connector to a fourth ruggedized connector. In one aspect, the first ruggedized connector and the second ruggedized connector are the same (i.e. have the same connection format) and the third ruggedized connector and the fourth ruggedized connector are the same. In an alternative aspect, the first ruggedized connector and the third ruggedized connector can be different (i.e. have different connection formats).

Thus, the first cable connection structure can be configured to accept a pair of ruggedized connectors (e.g. ruggedized connector 50 shown in FIG. 2) having a first connection format and the second cable connection structure can be configured to accept a pair of ruggedized connectors (e.g. a pair of OptiTap connectors) having a second connection format. In yet another aspect, the pair of ruggedized optical fiber connectors of at least one of the first and second cable connection structures have different connection formats such that the at least one of the first and second cable connection structures is a hybrid connection structure similar to cable connection structure 500 shown in FIG. 7A.

Figure 11:
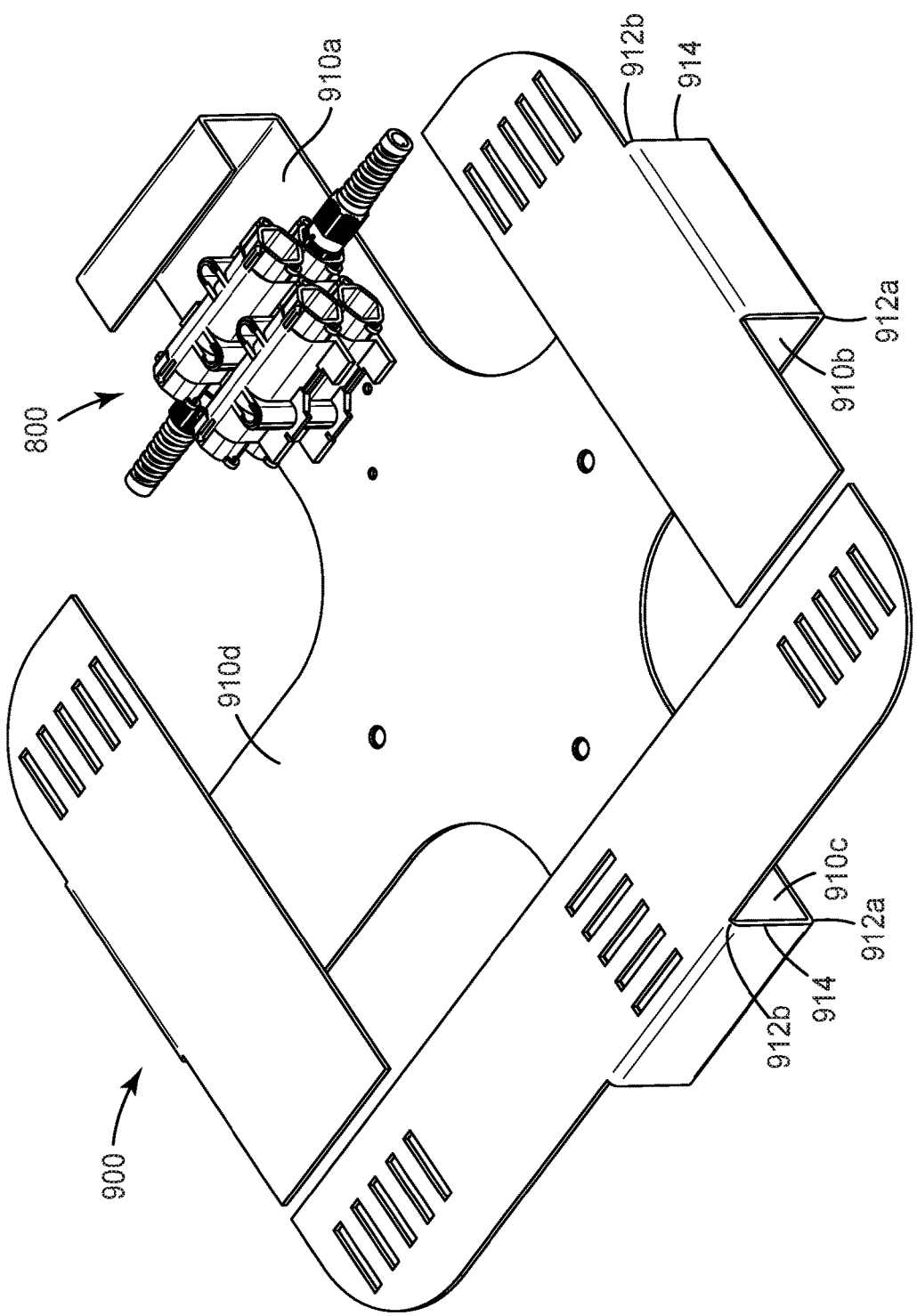
FIG. 11 is a view of the ruggedized cable connection assembly of FIGS. 9A-9D in combination with a cable slack storage accessory.

FIG. 11 shows cable connection assembly 800 in conjunction with an exemplary slack storage accessory 900. The exemplary slack storage accessory 900 is configured to hold any excess length of optical fiber cable. The slack storage accessory 900 have a plurality of arms 910a-910d that are joined at one end near the center of the slack storage accessory. The arms can be include two bends 912a, 912b to form an open box shaped cable retention structure 914 to retain the slack cable in the slack storage accessory. In an exemplary aspect, the cable connection assembly can be mounted to one of the arms (e.g. arm 910a) such that the mechanical fasteners used to attach the cable connection assembly to a mounting surface will also hold the slack storage accessory to the mounting surface.

Figure 12:
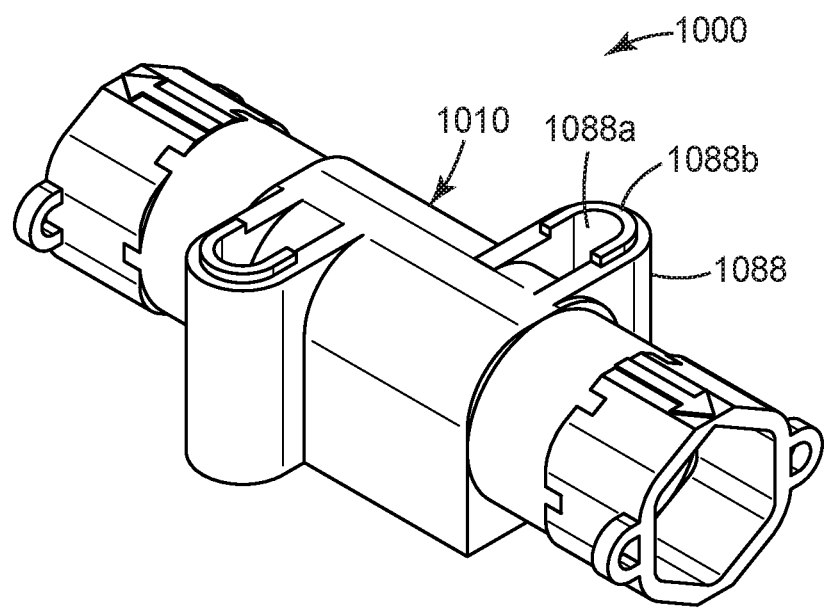
FIG. 12 is an isometric view of a ruggedized cable connection structure according to a sixth embodiment the present invention.

In the exemplary aspect shown in FIG. 12, exemplary cable connection structure 1000 includes an interconnection feature such as vertical alignment guides 1088 integrally formed with the housing 1010 of the cable connection structure. Vertical alignment guides 1088 enable stacking of a second cable connection structure (not shown) on top of the cable connection to form a cable connection assembly comprising a vertical stack of cable connection structures. Vertical alignment guide 1088 can have a bore 1088a extending therethrough to allow insertion of a mechanical fastener (not shown). In an exemplary aspect, a mechanical fastener that is inserted through the vertical alignment guide can also be used to attach a plurality of cable connection structures together and/or to attach one or more cable connection structures to a mounting surface. The cable connection assembly 1000 can include a lip 1088b around the entrance of the bore through the vertical alignment guide on the cable connection structure that can interact with a matching depression or receptacle (similar to depression 888 shown on the bottom of connection structure 800A in FIG. 10C) within the bottom of a flange of a second cable connection structure to form cable connection assembly 800. In an exemplary aspect, the lip on the first cable connection structure and the receptacle on the second cable connection structure can allow assembly of the first cable connection structure and the second cable connection structure into a signal unit via a mechanical interference or snap fit. This allows the first and second cable connection structures to be dry fit together prior to attaching the cable connection assembly to the mounting surface or inserting the mechanical fastener through the vertical guides to secure a plurality of cable connection structures together.

Figure 13A:
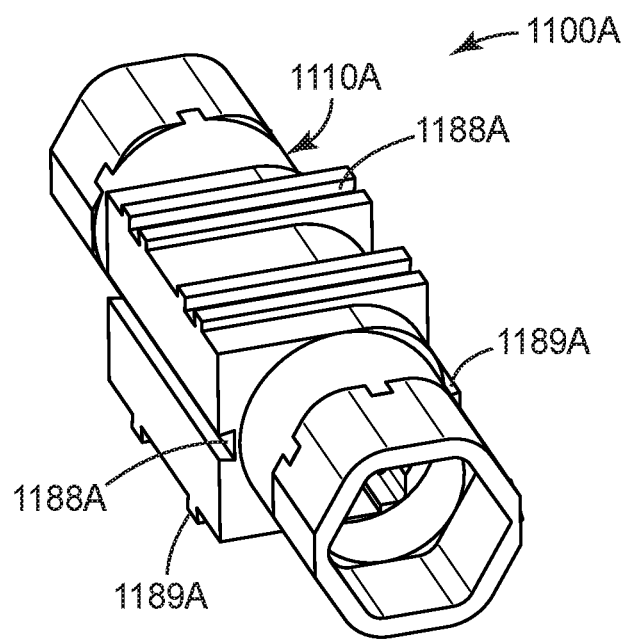
FIG. 13A is an isometric view of a ruggedized cable connection structure according to a sixth embodiment the present invention.
Figure 13B:
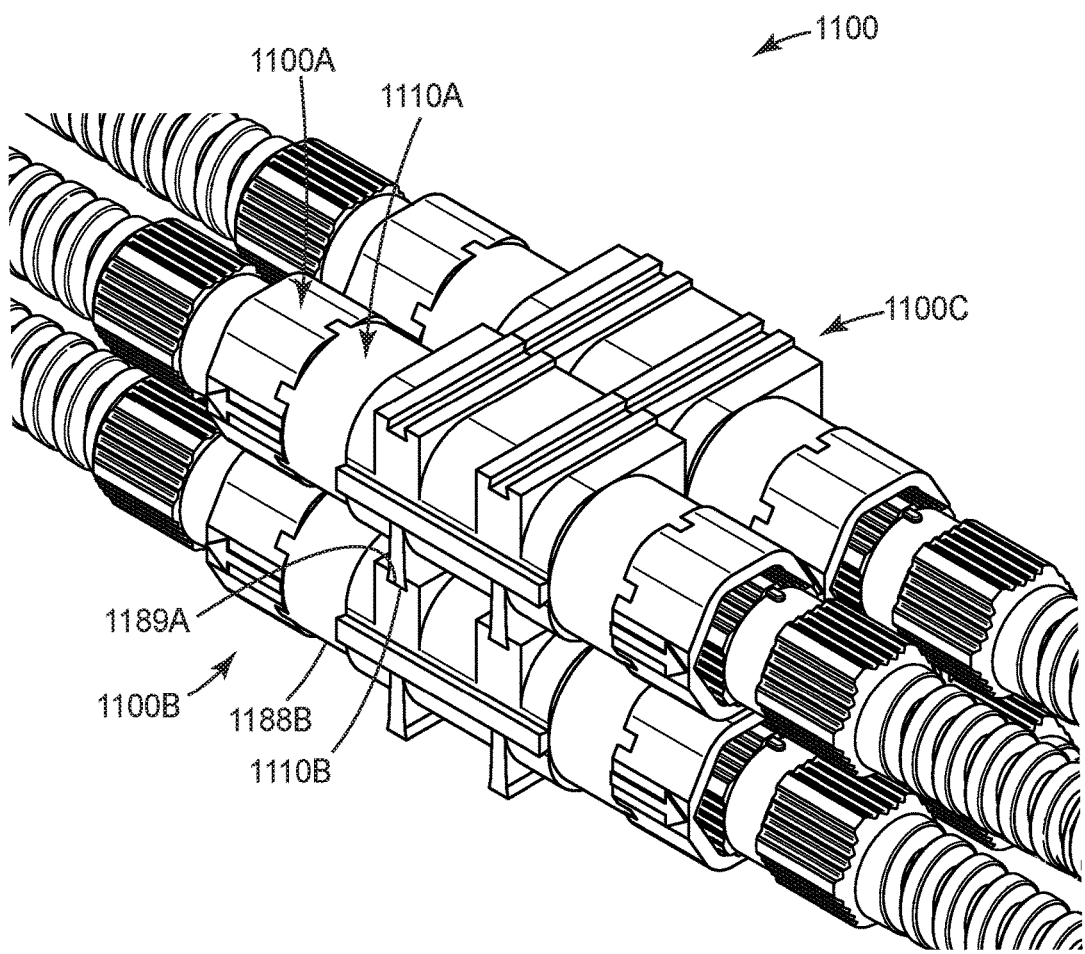
FIG. 13B is an isometric view of a ruggedized cable connection assembly comprising four ruggedized cable connection structures of FIG. 13A.

FIG. 13A shows an exemplary cable connection structure 1100A that includes dovetail interconnection features such as rail 1189A and a receiving groove 1188A integrally formed with the housing 1110A to join a plurality of cable connection structures to form a cable connection assembly 1100. The cable connection assembly can be either a one or two dimensional array of connection structures 1100A-1100C, as illustrated in FIG. 13B (note that there is a fourth interconnection structure in cable connection assembly 100, but it is not visible in the figure).

In an exemplary aspect, cable connection structure 1100A includes one rail and one receiving groove on opposite sides of housing 1110A that extend longitudinally with the housing and two rails and two receiving grooves disposed on the other two sides of the housing opposite one another. This layout of the dovetail interconnection features provide a simple means of controlling the alignment of the cable connection structures as they are assembled into a cable connection assembly. For example, FIG. 13B shows the dovetail interconnection of cable connection structures 1100A, 1100B between rail 1189A on housing 1110A and receiving groove 1189B on housing 1110B.

In one aspect, the cable connection assembly is held together by an interference fit between the rail and the receiving groove, while in another aspect, the craftsman can lay down a thin bead of adhesive, such as an epoxy adhesive or a structural acrylic adhesive, in the receiving groove(s) prior to insertion of the rail into the groove to adhesively bond the cable connection structures in the cable connection assembly together.

By providing both interlocking structures and vertical alignment guides on the cable connection structures enables the formation of cable connection assemblies having an array of cable connection structures, effectively enabling the creation of a modular bulkhead for the interconnection of ruggedized optical fiber connectors. Because the bulkheads can be assembled in the field from one modular building block (i.e. the cable connection structure described above), the craftsman can tailor the bulkhead both in terms of needed capacity as well as to fit in the available mounting space. The modular building block structure has significant advantages over conventional terminals, NIDS and other telecommunication enclosures used as a connection point between ruggedized optical fiber cables in terms of cost, flexibility and aesthetics of the installation.

The cable connection structures of the present invention provides environmental protection for direct connection of a pair of ruggedized optical fiber connectors in a structurally rigid connection interface. In one aspect, the exemplary cable connection structures can be conveniently mounted via mechanical fasteners or an adhesive. In some aspects the exemplary cable connection structure can eliminate the NID located at the end user, replacing it with a much smaller, lower profile connection interface.

In some exemplary embodiments, interconnection features are provided which enable the joining of a plurality of cable connection structures into a cable connection assembly. The cable connection assembly can work well for dense FTTP installations such as for premises having more than one residence or office, eliminating the need for a larger, more expensive fiber terminal to be located on the exterior surface of said premises.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

We claim:

1. A ruggedized cable connection structure configured to direct mate first and second ruggedized optical fiber connectors, the connection assembly comprising:
a housing having a channel extending from a first end of the housing through to the second end of the housing and an interconnection feature to allow connection to another cable connection structure, wherein the interconnection feature includes a vertical alignment guide extending from the housing transverse to a longitudinal axis of the cable connection structure to allow a second cable connection structure to be mounted on top of the housing; and
an adapter secured within the channel near a midpoint of the housing to enable direct mating of the first and second ruggedized optical fiber connectors.

2. The connection structure of claim 1, wherein the interconnection feature includes a flange that extends from the housing to allow connection of the cable connection structure to a mounting surface.

3. The connection structure of claim 2, further comprising at least one interlocking structure disposed on the flange to enable interconnection of a plurality of the cable connection structures.

4. The connection structure of claim 1, wherein the channel provides sufficient clearance to allow the adapter to be removably inserted into the channel from one of the first end and the second end of the housing.

5. The connection structure of claim 1, wherein the channel is defined by a characteristic minimum diameter and the adapter has a maximum cross sectional area perpendicular to a connection axis of the adapter, the cross sectional area having a characteristic maximum dimension, and wherein the minimum diameter of the channel is less than the maximum dimension of the cross sectional area of the adapter.

6. The connection structure of claim 1, wherein the adapter has a first connection format on a first side of the adapter that is configured to mate with the first ruggedized optical fiber connector and a second connection format on a second side of the adapter that is configured to mate with the second ruggedized optical fiber connector.

7. The connection structure of claim 1, wherein the vertical alignment guide has a bore extending therethrough, a mechanical fastener inserted through the vertical alignment guide attaches the second cable connection structure on top of the housing.

8. A ruggedized cable connection structure configured to direct mate first and second ruggedized optical fiber connectors, the connection assembly comprising:
a housing having a channel extending from a first end of the housing through to the second end of the housing, and an integral mounting flange extending from and integrally formed with the housing to allow connection to a mounting surface, wherein the flange includes a linking edge disposed parallel to the longitudinal axis of the ruggedized cable connection structure, the linking edge having at least one mechanical interlocking structures to mechanically interlock the ruggedized cable connection structure to a second cable connection structures in a side by side configuration; and
an adapter secured within the channel near a midpoint of the housing to enable direct mating of the first and second ruggedized optical fiber connectors.

9. The connection structure of claim 8, wherein the channel provides sufficient clearance to allow the adapter to be removably inserted into the channel from one of the first end and the second end of the housing.

10. The connection structure of claim 8, wherein the linking edge has a stepped configuration that includes a latch portion and a catch portion, wherein latch portion on the flange of the cable connection structure connects with the catch portion of the cable connection.

11. The connection structure of claim 8, further comprising a vertical alignment guide extending from the housing transverse to a longitudinal axis of the cable connection structure to allow a third cable connection structure to be mounted on top of the housing.

* * * * *